No. 668,833. Patented Feb. 26, 1901.
G. H. GILBERT.
KNITTING MACHINE.
(Application filed Mar. 26, 1891.)
(No Model.) 17 Sheets—Sheet 1.
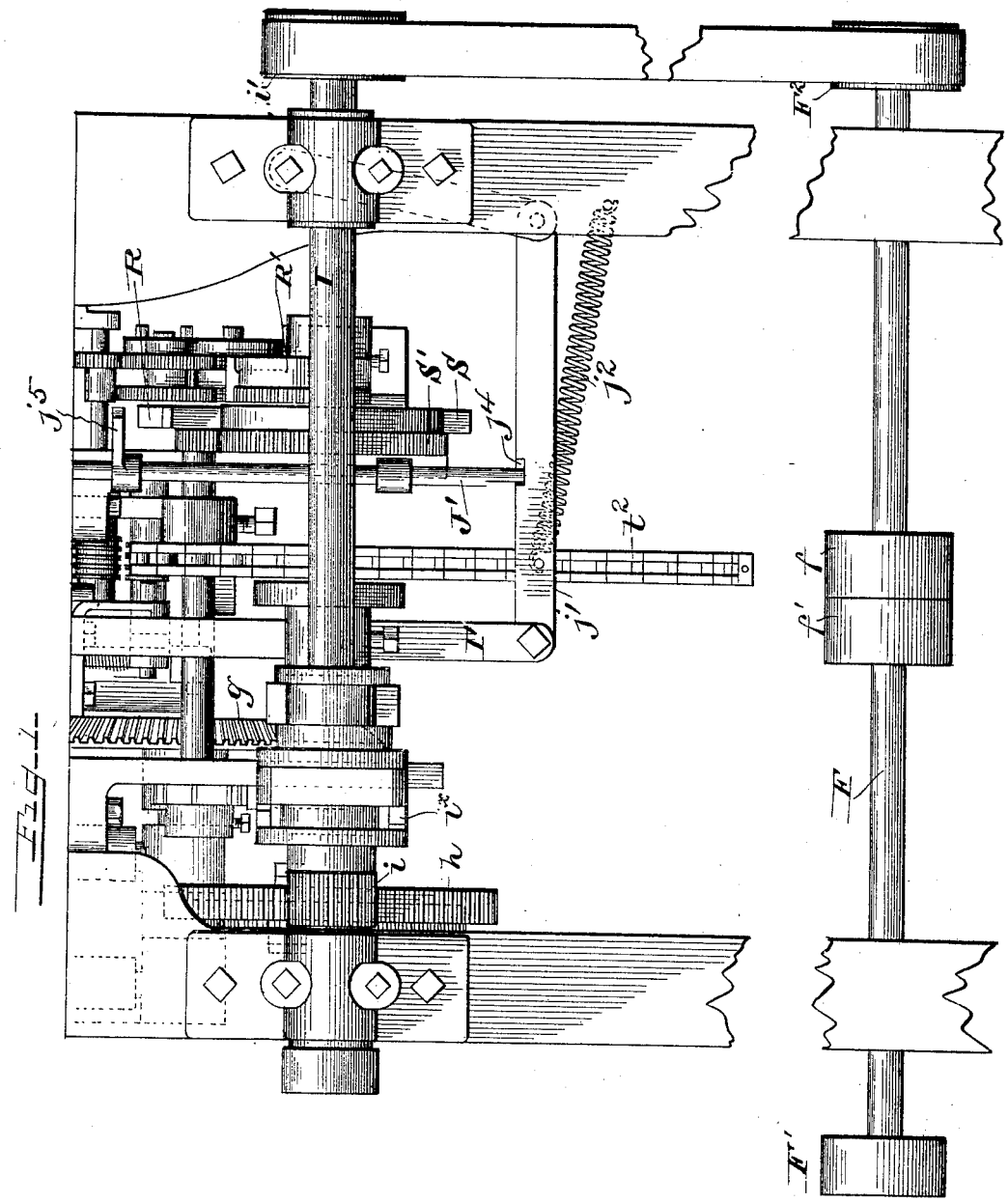

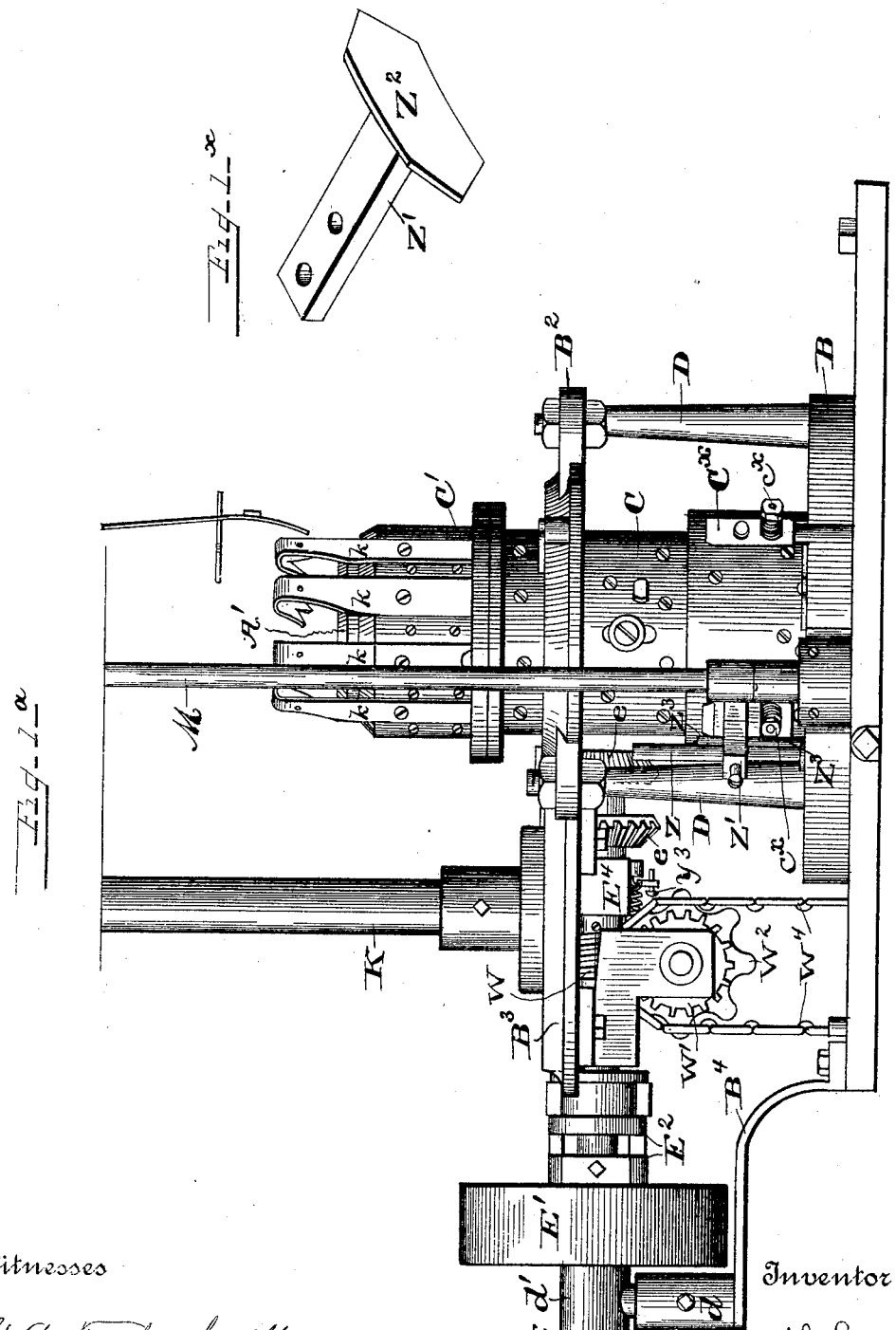

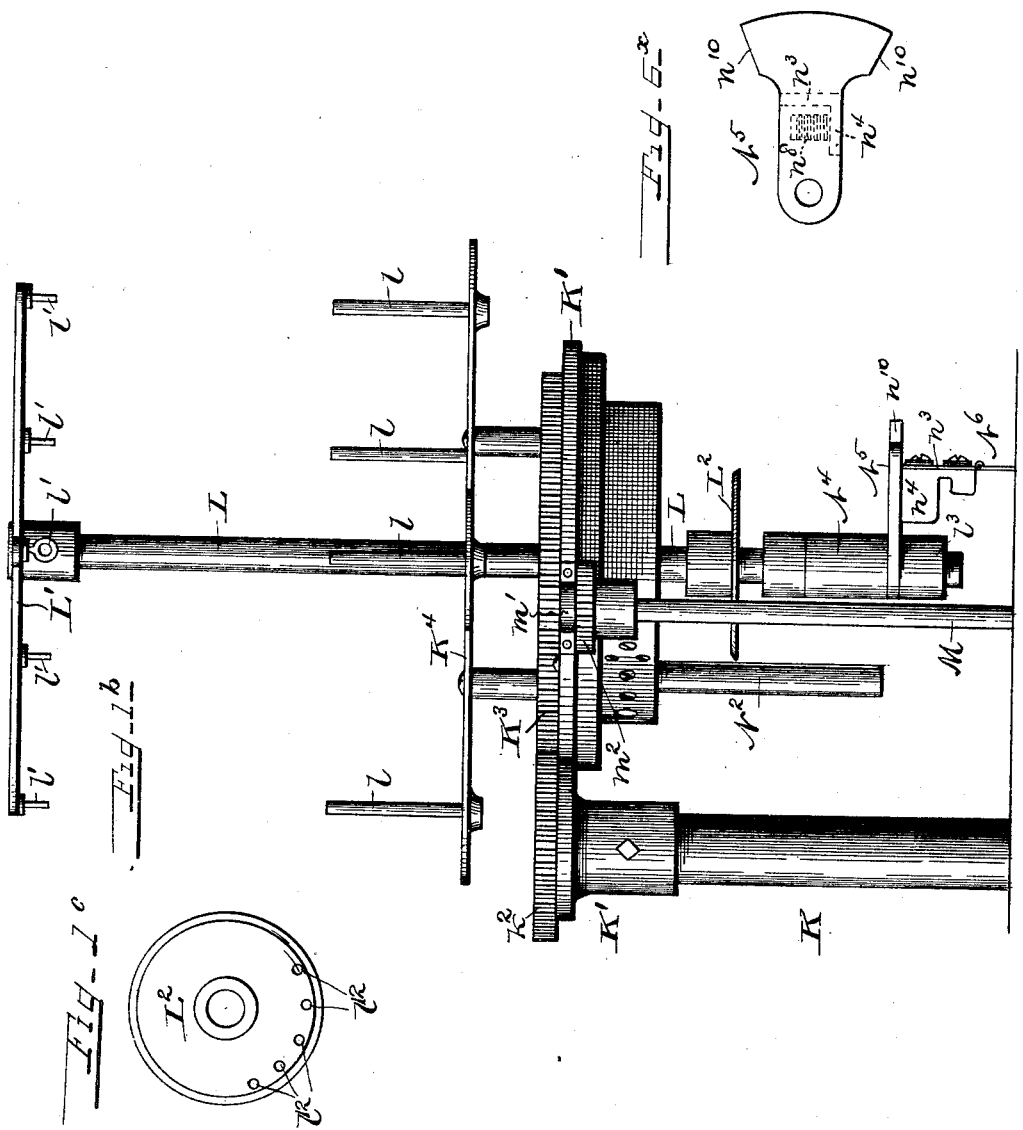

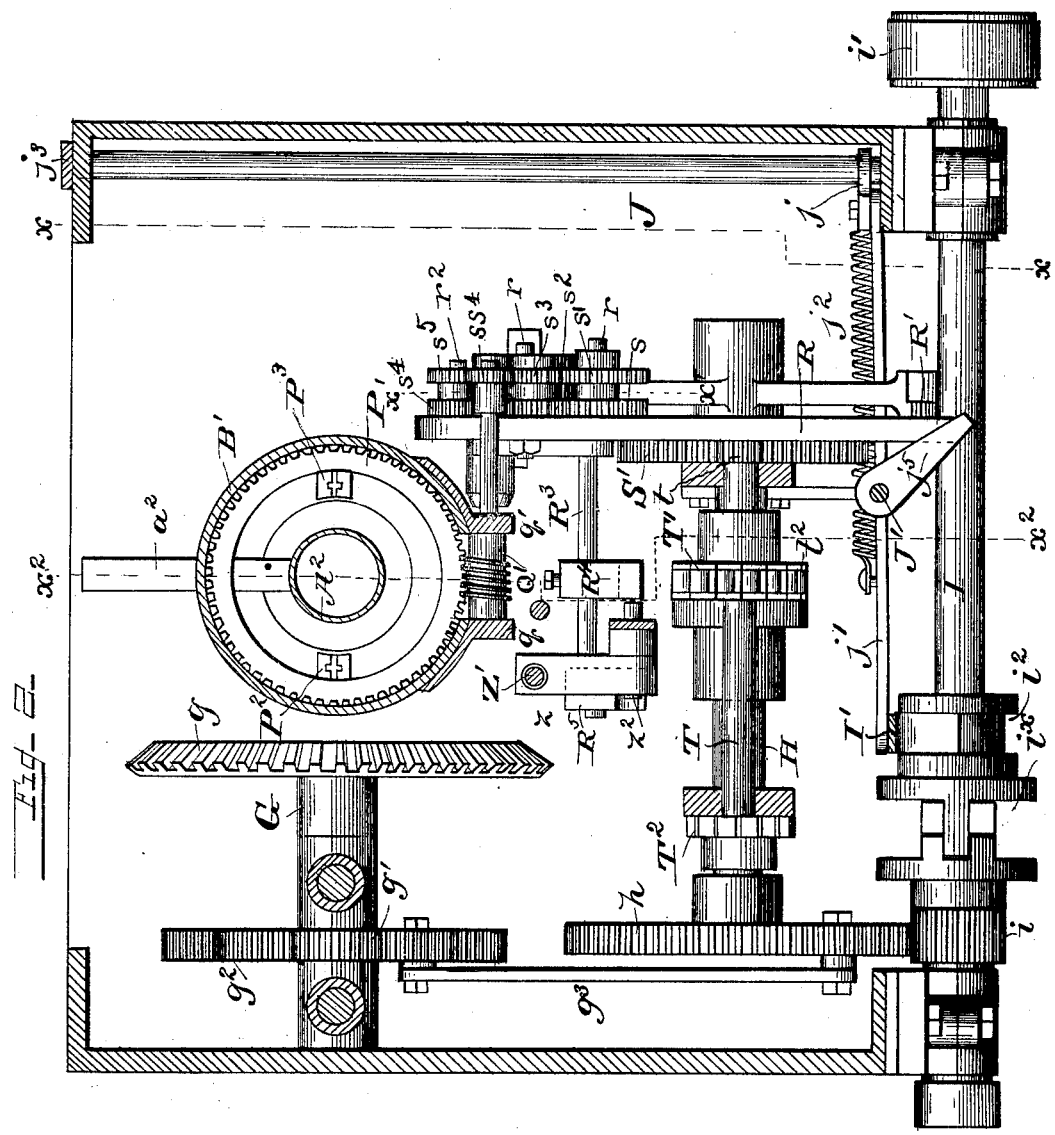

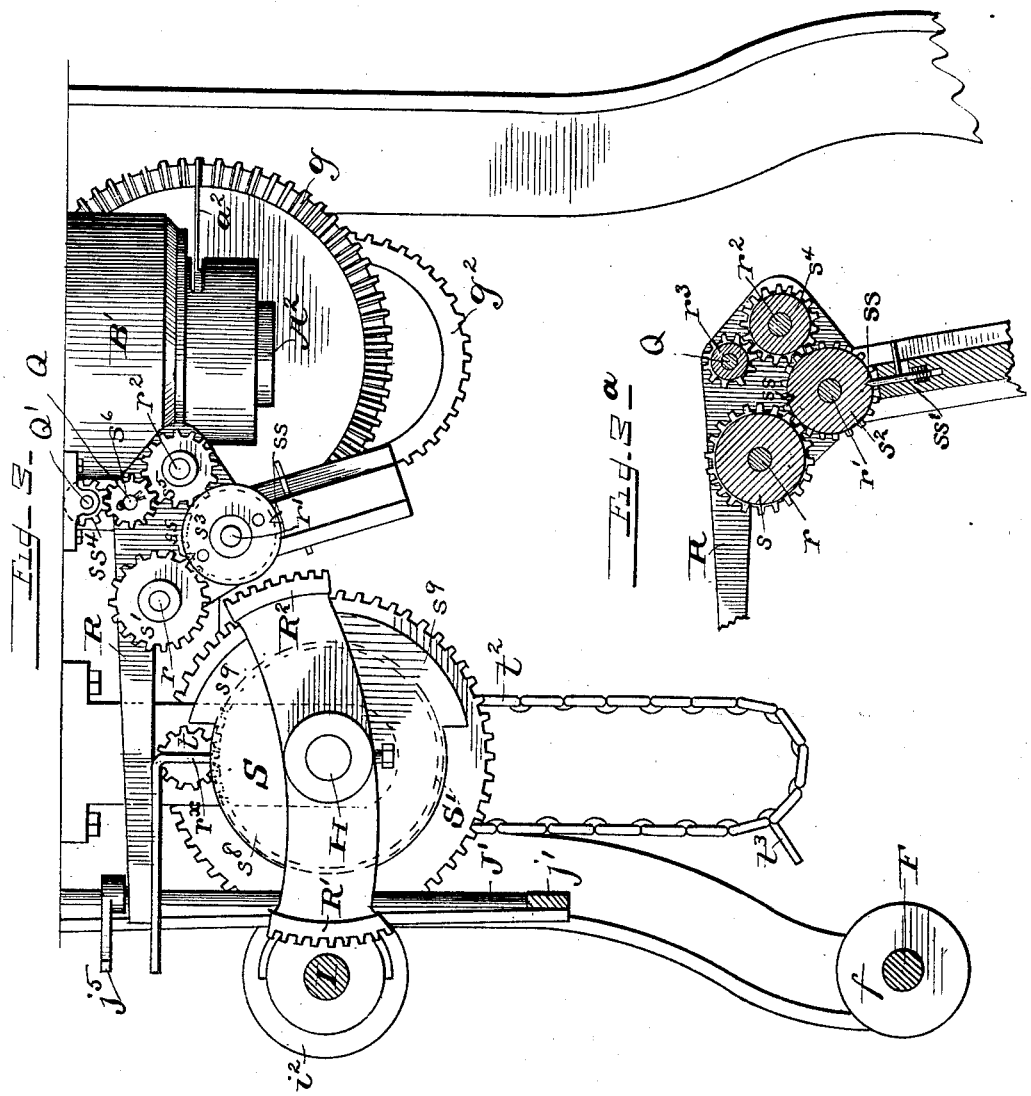

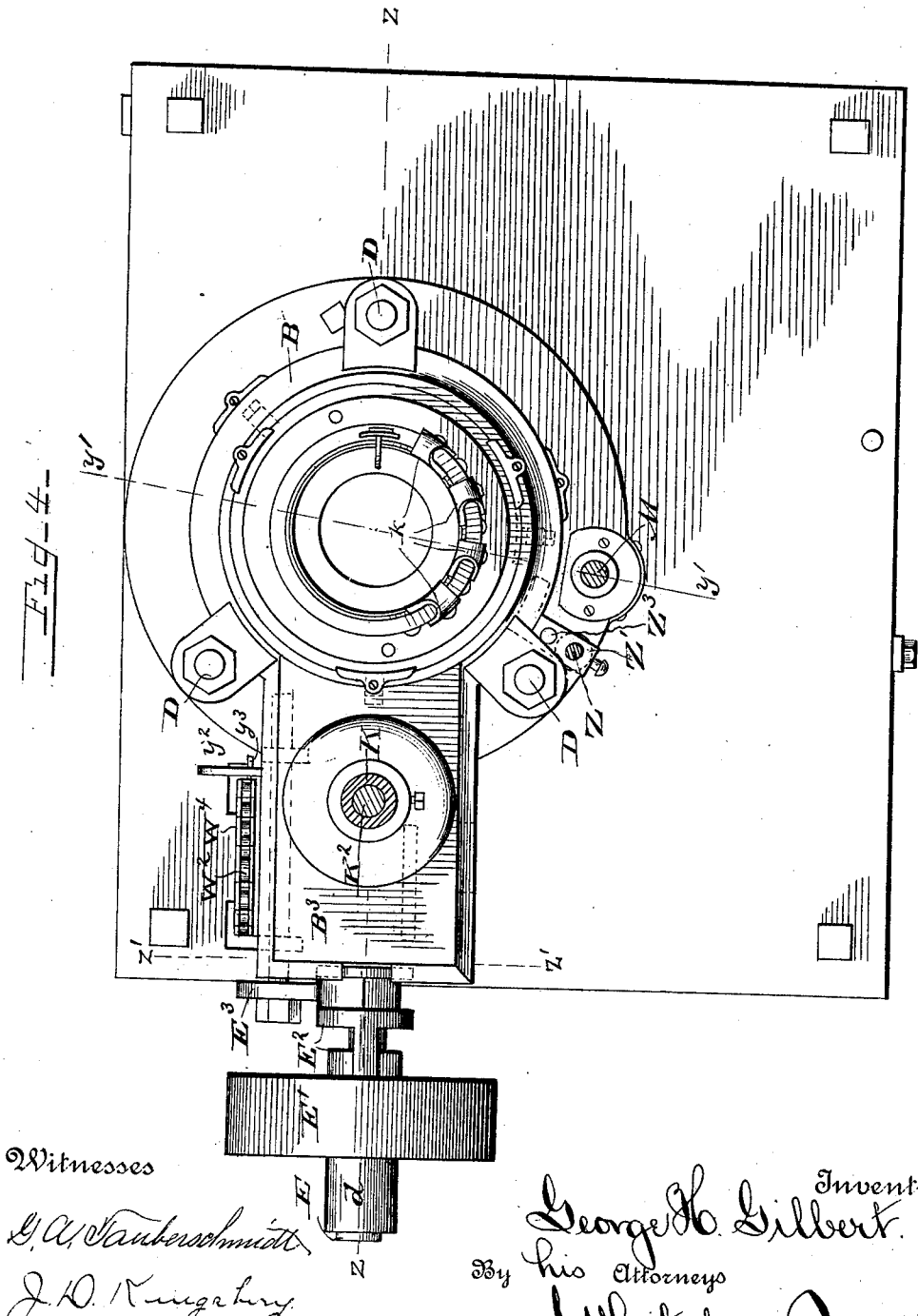

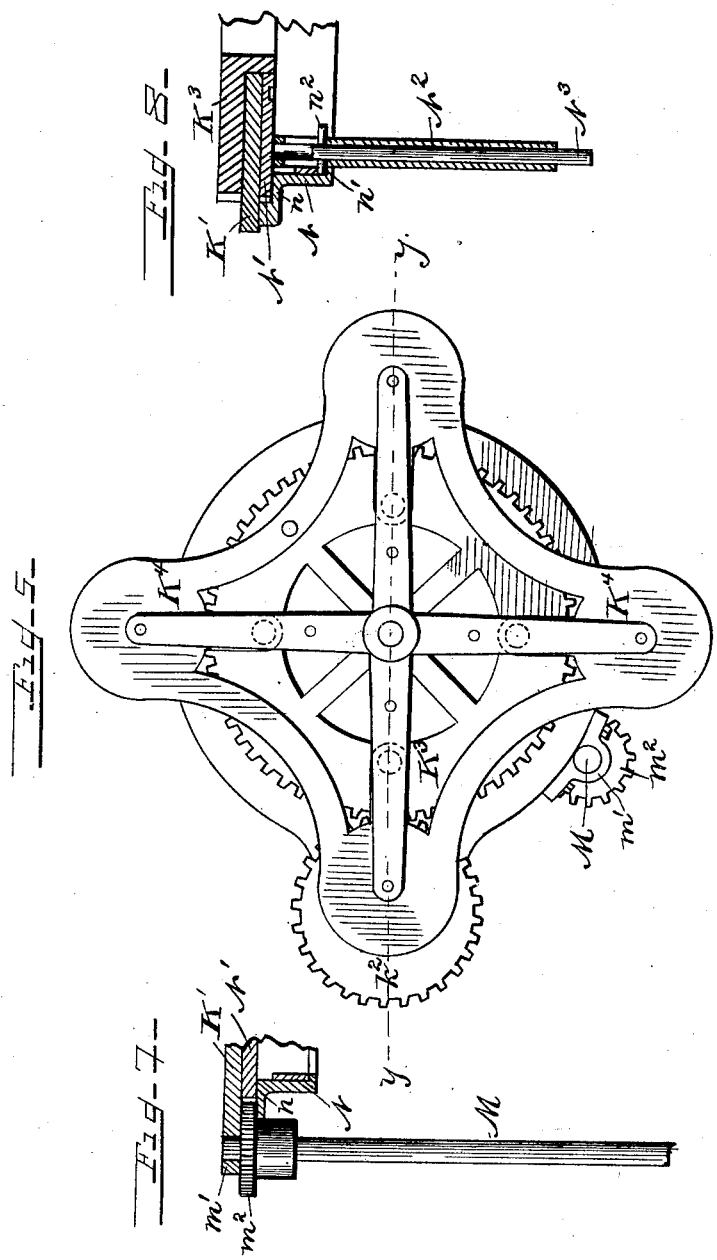

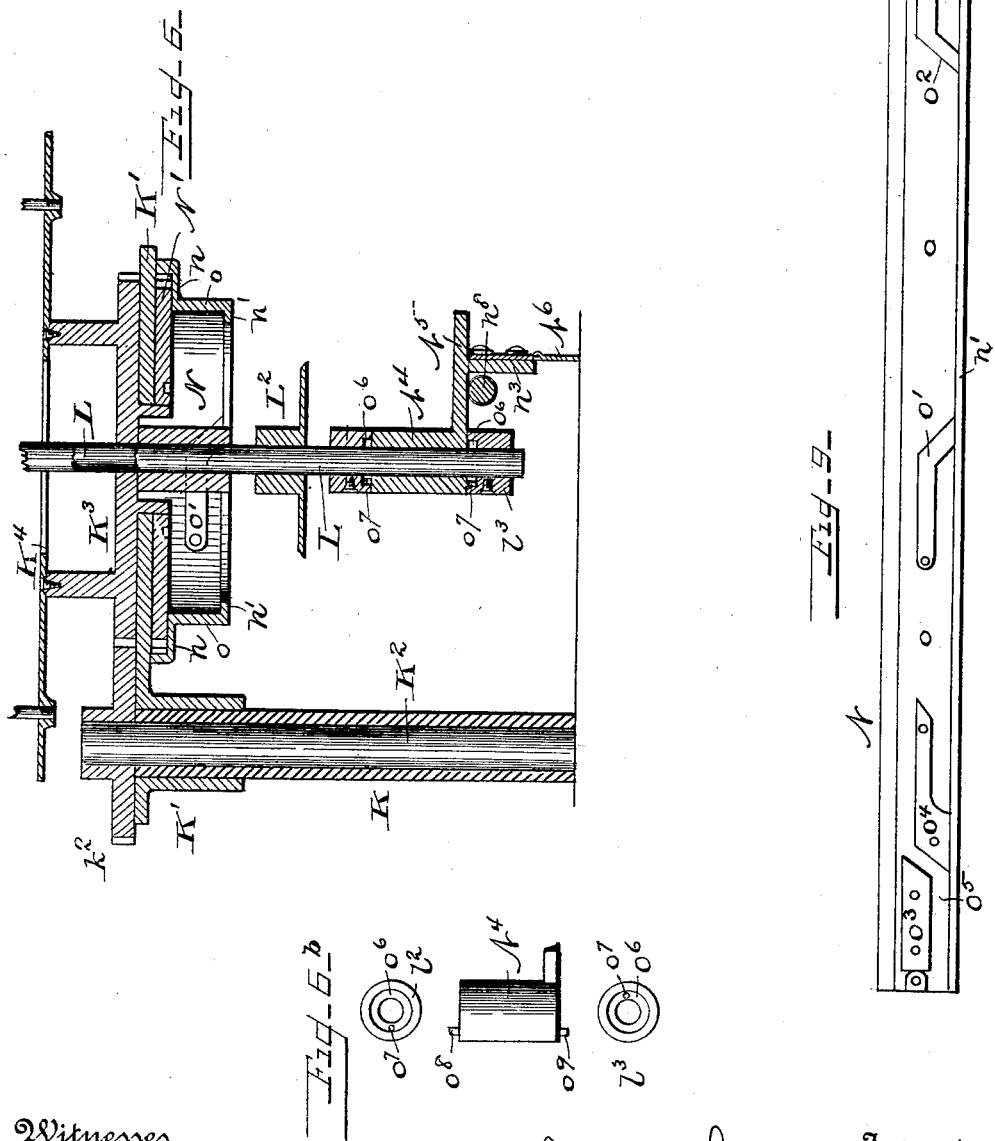

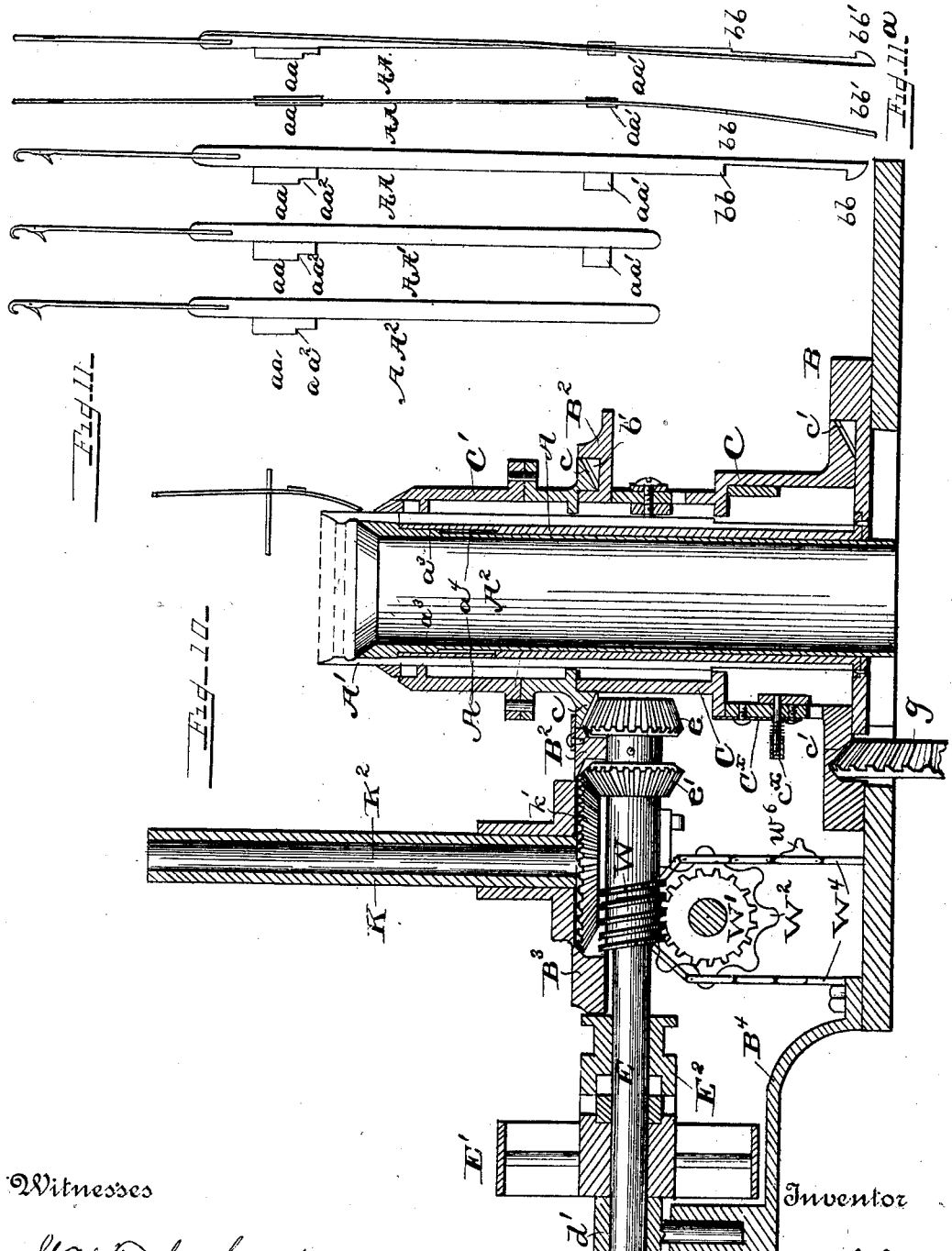

No. 668,833. Patented Feb. 26, 1901.
G. H. GILBERT.
KNITTING MACHINE.
(Application filed Mar. 26, 1891.)
(No Model.) 17 Sheets—Sheet 10.
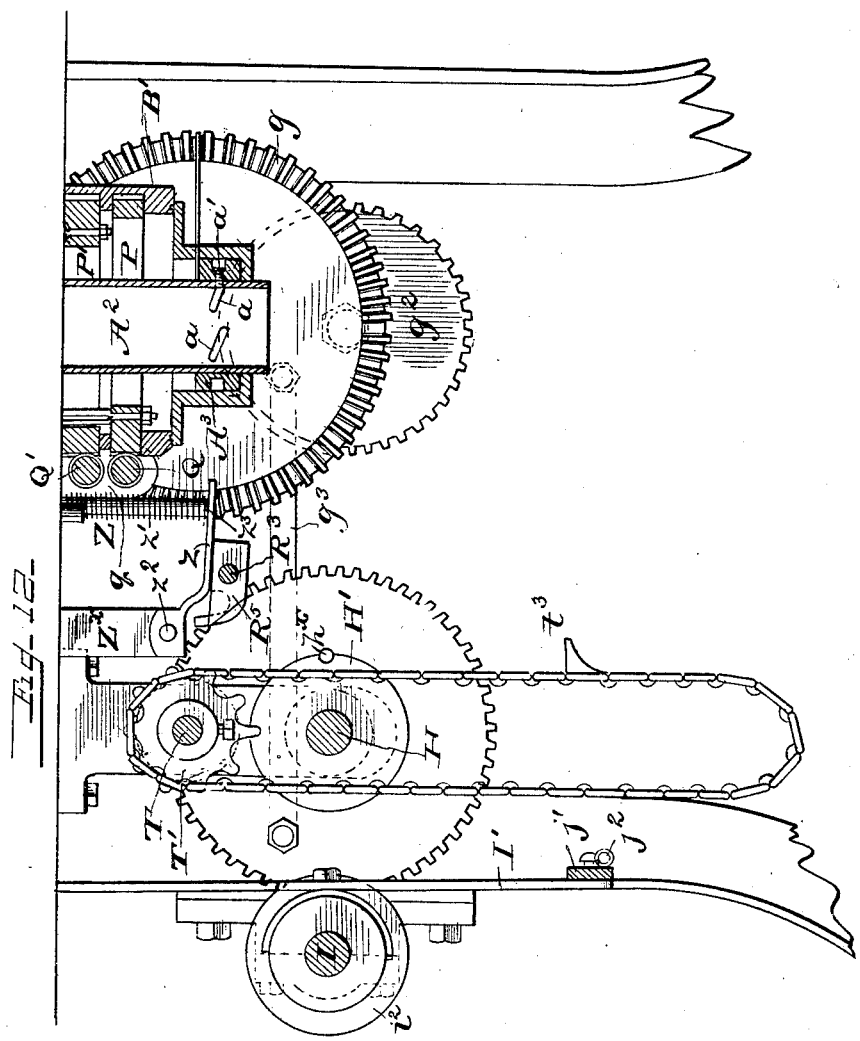
Witnesses
G. A. Tauberschmidt
J. D. Kingsbury
Inventor
George H. Gilbert
By his Attorneys
Whitaker & Prevost

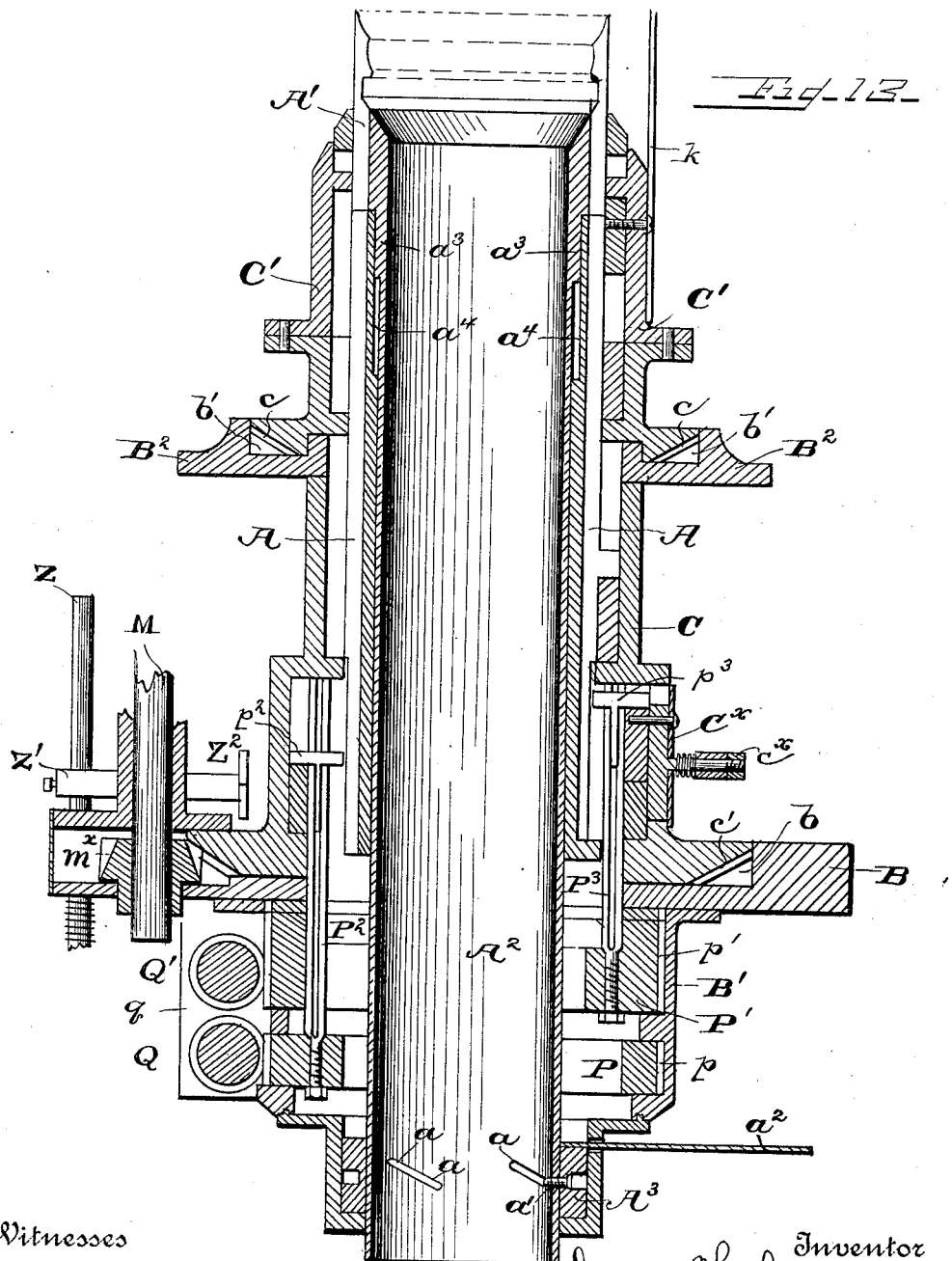

No. 668,833. Patented Feb. 26, 1901.
G. H. GILBERT.
KNITTING MACHINE.
(Application filed Mar. 26, 1891.)
(No Model.) 17 Sheets—Sheet 12.

Witnesses
G. A. Tauberschmidt
J. D. Kingsbury

Inventor
George H. Gilbert
By his Attorneys
Whitaker & Prevost

THE NORRIS PETERS CO., PHOTO-LITHO., WASHINGTON, D. C.

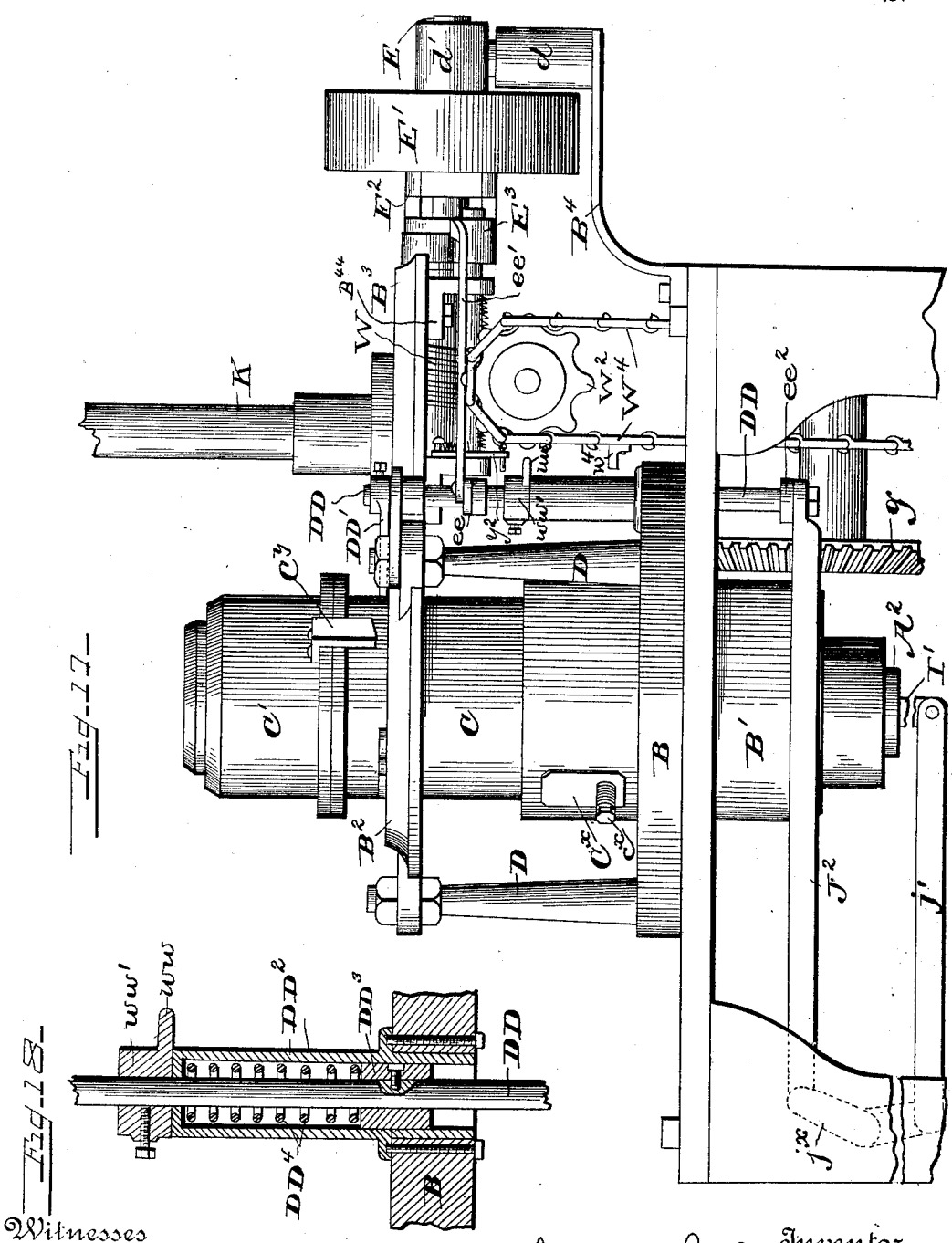

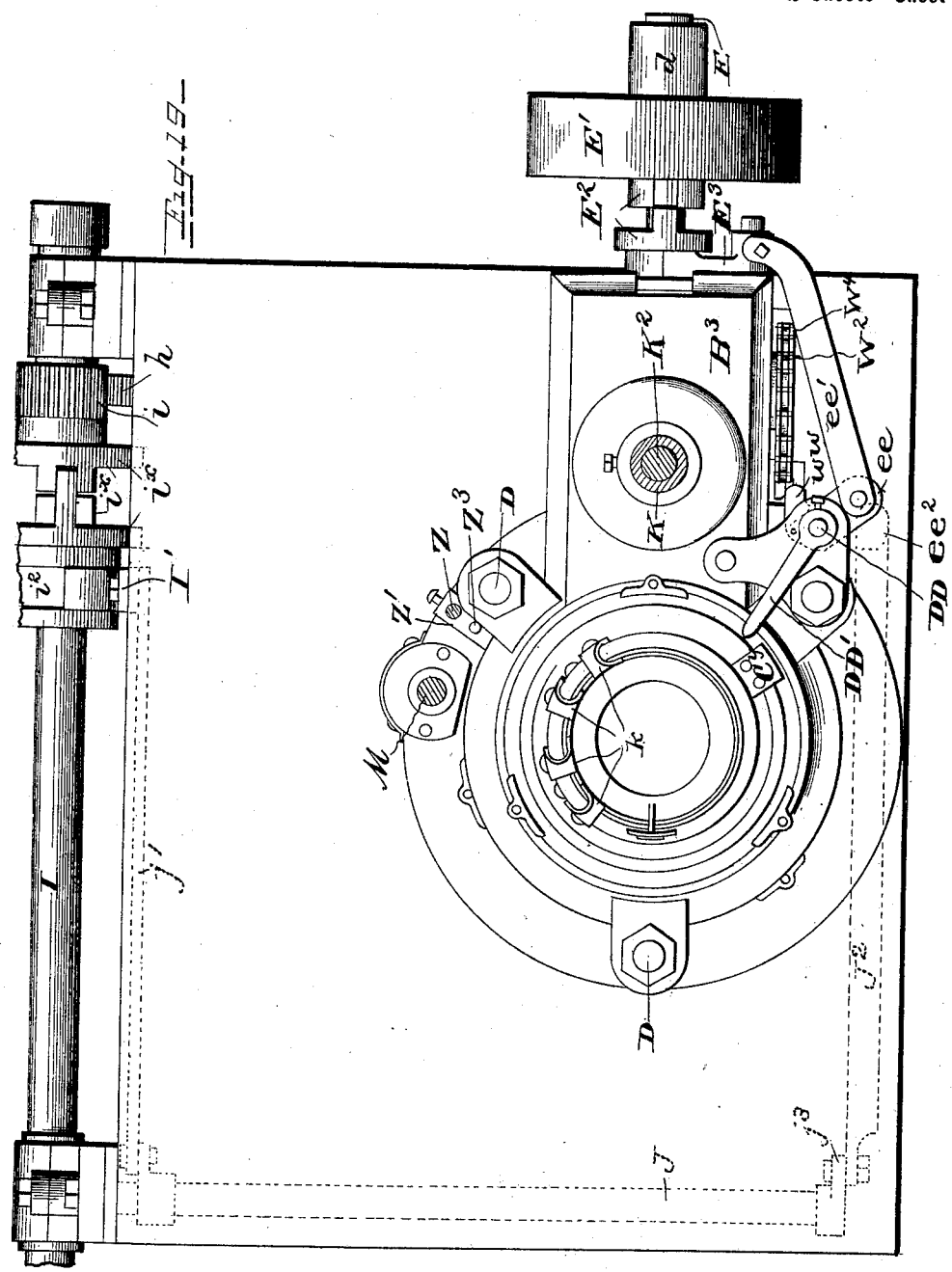

No. 668,833. Patented Feb. 26, 1901.
G. H. GILBERT.
KNITTING MACHINE.
(Application filed Mar. 26, 1891.)
(No Model.) 17 Sheets—Sheet 15.
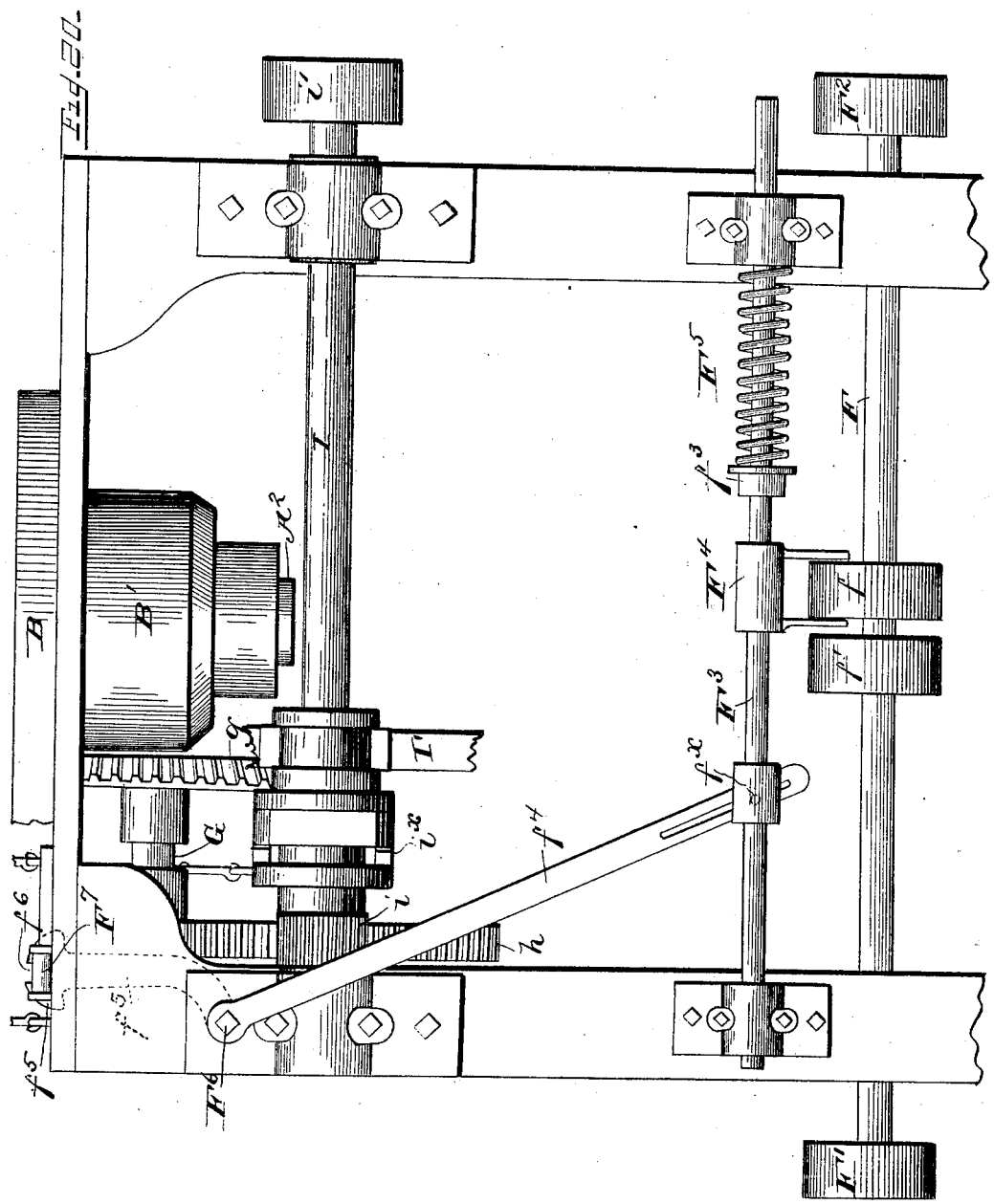

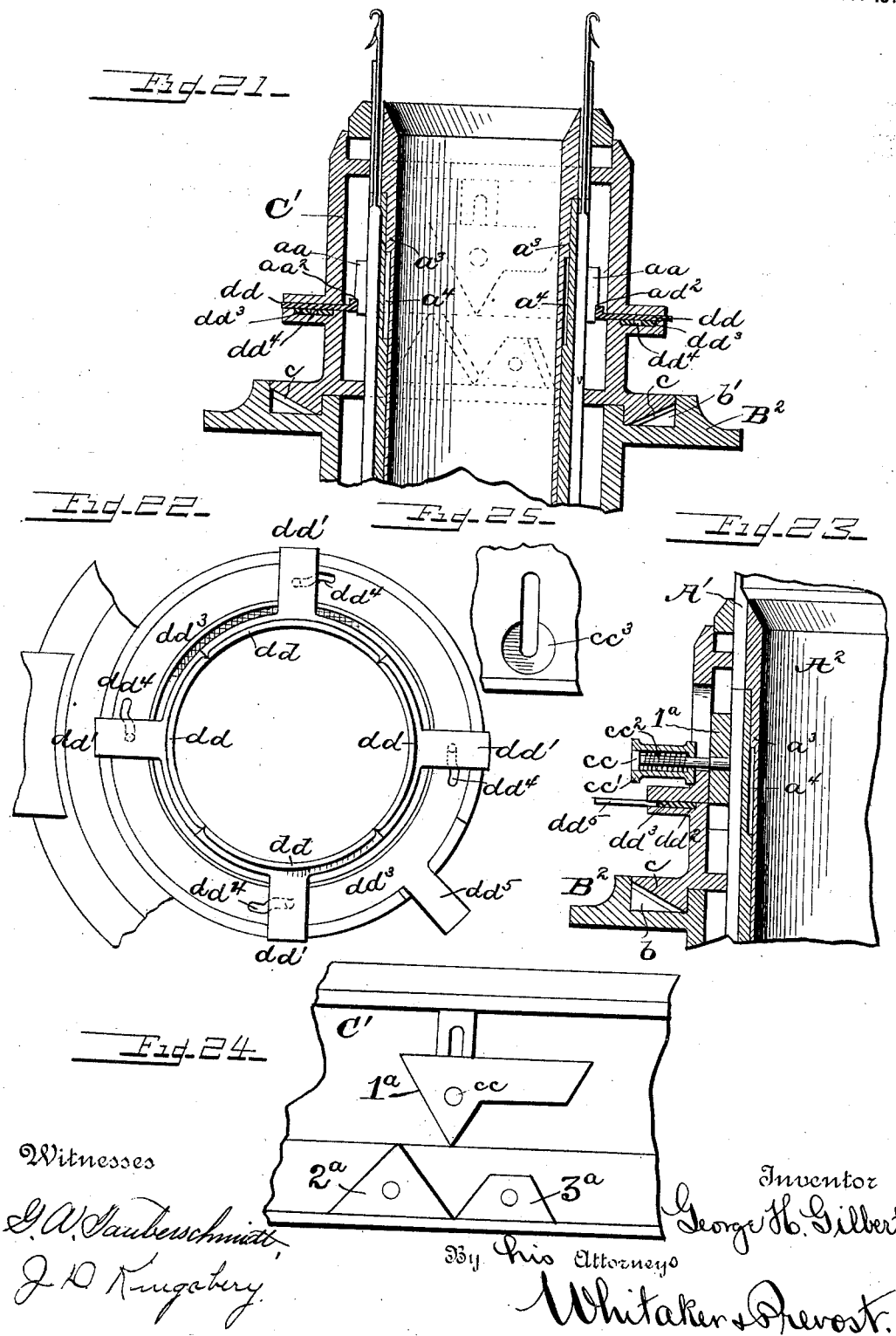

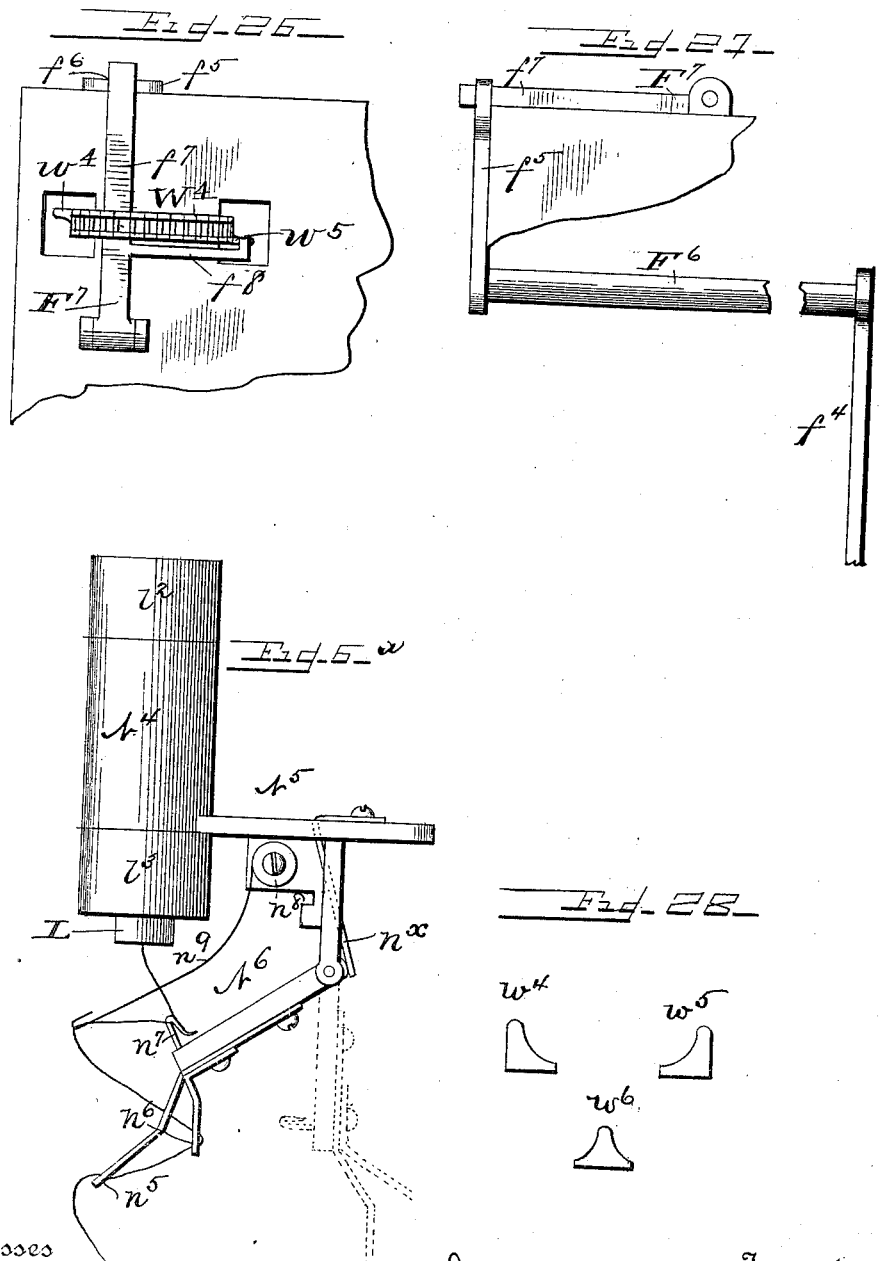

UNITED STATES PATENT OFFICE.

GEORGE H. GILBERT, OF GERMANTOWN, PENNSYLVANIA, ASSIGNOR TO THE KILBOURN KNITTING MACHINE CO.

KNITTING-MACHINE.

SPECIFICATION forming part of Letters Patent No. 668,833, dated February 26, 1901.

Application filed March 26, 1891. Serial No. 386,550. (No model.)

*To all whom it may concern:*

Be it known that I, GEORGE H. GILBERT, a citizen of the United States, residing at Germantown, in the county of Philadelphia and State of Pennsylvania, have invented certain new and useful Improvements in Circular-Knitting Machines; and I do hereby declare the following to be a full, clear, and exact description of the invention, such as will enable others skilled in the art to which it appertains to make and use the same.

My present invention relates to knitting-machines; and it consists in certain improved constructions and combinations of parts in machines of the class known as "automatic circular-knitting machines."

In the accompanying drawings I have illustrated the best modes in which I have contemplated embodying my invention, and said invention is fully disclosed in the following specification and claims.

Figure 14:
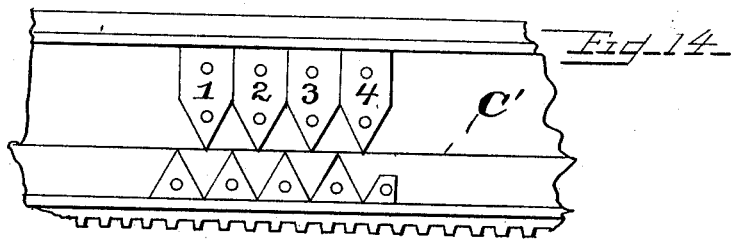
Figure 15:
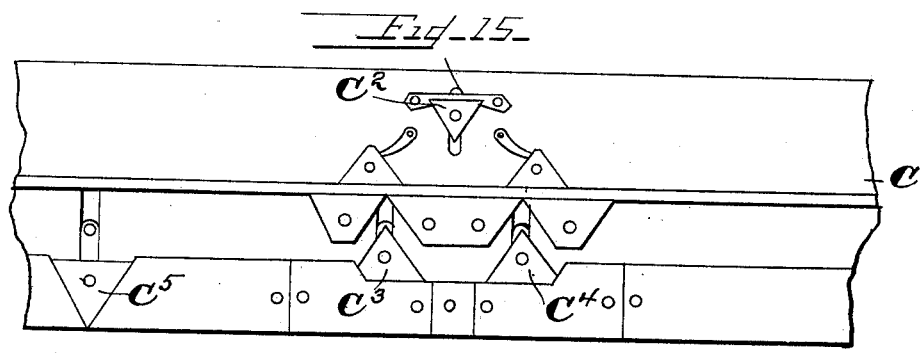
Figure 16:
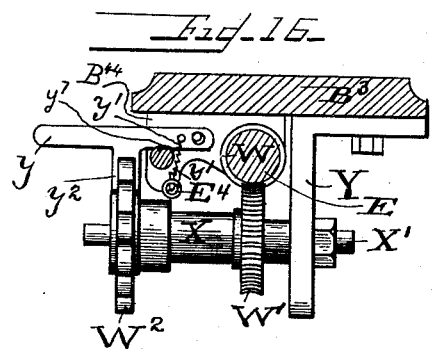

Figure 1 of the drawings is a broken rear elevation of the parts lying below the bed-plate of the machine. Fig. $1^a$ is a rear elevation of the parts immediately above the bed-plate of the machine. Fig. $1^b$ is a rear elevation of parts above those shown in Fig. $1^a$, the three figures forming an entire rear view of the machine. Fig. $1^c$ is a plan view of the disk $L^2$. Fig. $1^x$ is a view of the shifter-plate for shifting the picker-cams. Fig. 2 is a plan view of the parts below the bed-plate of the machine. Fig. 3 is a vertical section on line $x\ x$, Fig. 2. Fig. $3^a$ is a vertical section on line $x'\ x'$, Fig. 2. Fig. 4 is a plan view of the parts shown in Fig. $1^a$. Fig. 5 is a plan of the parts shown in Fig. $1^b$. Fig. 6 is a sectional view on line $y\ y$, Fig. 5. Fig. $6^a$ is a view of part of the reciprocating thread-guide. Fig. $6^b$ is a detail view of the same. Fig. $6^x$ is a plan of the reciprocating thread-carrier cam. Figs. 7 and 8 are sectional details of parts of the same construction shown in Fig. 5. Fig. 9 is a detail of the cams employed in connection with the thread-guide for reciprocating work. Fig. 10 is a section on line $z\ z$, Fig. 4, looking from the rear of the machine. Fig. 11 is a side view of the needles employed in the machine. Fig. $11^a$ is an edge view of two different constructions of needles. Fig. 12 is a section on line $x^2\ x^2$, Fig. 2, looking from the left hand of the machine. Fig. 13 is an enlarged section on line $y'\ y'$, Fig. 4. Fig. 14 is a detail of the upper needle-cams. Fig. 15 is a detail of the lower needle and picker cams; and Fig. 16 is a section on line $z'\ z'$, Fig. 4, looking from the right-hand side of the machine. Fig. 17 is a partial front elevation of my improved machine with automatic shifting devices for changing from circular to reciprocating work and from reciprocating to circular work attached. Fig. 18 is a sectional detail of part of the automatic devices. Fig. 19 is a plan view of the machine and automatic shifting devices. Fig. 20 is a view of the bed-plate and supporting means and operating mechanism from the rear of the machine, showing automatic means for stopping the machine at any desired point. Fig. 21 is a partial sectional view of the needle-cylinder and upper cam-ring, showing means for holding needles in an elevated position for running on work. Fig. 22 is a plan view of the lower part of the cam-cylinder with the means for holding the needles. Fig. 23 is a partial section of the upper cam-cylinder. Fig. 24 is a partial interior elevation of the same. Fig. 25 is a partial view of the cam-cylinder, showing countersink therein. Fig. 26 is a partial plan view of the bed-plate, showing detent-lever and connected parts. Fig. 27 is an elevation of part of the automatic belt-shipping mechanism detached. Fig. 28 is a detail of tappets of tappet-chain $W^4$.

Before the issue of my Patent No. 351,590, dated October 26, 1886, I had devised certain improvements thereon, and on March 10, 1887, I had progressed so far in the practical demonstration of the same that I made an application serially numbered 230,324, on which Patent No. 468,513 was granted me February 9, 1892, for a part of the said improvements. My said application disclosed a mode of moving the pickers or needle-shifters positively in both directions both during narrowing and widening and also a system of multiple needle-cams combined with the narrowing and widening devices so that during continuous circular knitting I was enabled to form two or more rows of stitches during a single revolution of the rotating parts, causing the reciprocation of the needles, and during reciprocating work the knitting was continued by the action of a single cam. The present application is for the perfected machine following out the same lines or general principles of constructions.

The machine is of that general class in which the stocking is made by knitting the leg by continuous rotary movement, then throwing a portion of the needles out of operation and by a reciprocating movement accompanied by first throwing a certain number of the outer needles of the series used for reciprocating work successively out of operative relation with the operating-cam, but caused to retain their stitches for narrowing, and then throwing these same needles successively into operative relation with their operating-cam in inverse order for widening to form the heel, then knitting the foot by a continuous rotary movement, and then forming the toe in a manner similar to that in which the heel was formed. The operations for knitting a stocking might be reversed—that is, the toe might be formed first, then the foot, then the heel, and then the leg—instead of having the operation conducted in the order just described. When speaking of the continuous rotary movement in knitting circular work, it will be understood that the class of knitting-machines referred to includes both those machines in which the needle cam or cams are rotated and those in which the needle-cylinder is actuated in the act of knitting and that my improvements are designed for application to both forms of machines.

The present invention being the completed machine partially illustrated in my said prior application, the construction here shown is in its main features substantially the same. The needles are operated by two cam-rings, the same as in my said former application. The needle shifters or pickers for throwing the needles out of action in narrowing are carried by two rings moved by two worms or screws and the said needle shifters or pickers are actuated by cam-grades in the lower cam-ring, the same as in my former application. The two cam-rings are held a space apart and out of contact with each other and the upper cam-ring is provided with a number of cams each engaging with all of the needles for circular work, as in my said former application.

My completed machine is also constructed so that the change from circular to reciprocating work and from reciprocating to circular work is automatically effected. It is also provided with devices whereby the machine is stopped after a predetermined number of stockings have been completed or after any predetermined amount of work has been accomplished. The automatic changing mechanism is so connected and combined with the other parts that by disconnecting the controlling parts of the automatic devices the machine will be stopped after completing a predetermined number of rows of circular work and also after each narrowing and widening operating. The machine will first be described as organized for stopping after these movements and then as an automatic machine or one organized for continuous operation, and this description will then be followed by a description of the means whereby the automatic stopping of the machine is effected after a predetermined amount of work has been accomplished.

Referring now to the drawings for a more particular description of the machine, A is the needle-cylinder, provided with grooves to receive needles in the usual manner. The needle-cylinder is supported on lugs or projections extending inwardly from the ring or annulus B, secured to the bed-plate of the machine, as best shown in Fig. 10. At its top the needle-cylinder is provided with a nosing A', forming an extension of the cylinder and provided with hooked partitions or sinkers located between the needles to assist in holding down the work and to aid the needles in casting off the stitches. This nosing is secured to the top of a tubular support $A^2$, which extends downward through the needle-cylinder A and is provided near the lower end with inclined slots $a\ a$. To the under side of the ring B is secured a casing B', in the lower part of which is mounted a ring $A^3$, so as to be capable of reciprocation in a horizontal plane, but held from vertical movement. This ring is provided with pins $a'\ a'$, engaging the slots $a$ in the cylinder $A^2$, and has also an arm or handle $a^2$, by which it can be turned when desired to raise or lower the nosing for the purpose of regulating the length of the stitches. The nosing and tubular support are held from rotating by splines or feathers $a^3$ on the tubular support, movably engaging vertical grooves $a^4$ on the interior of the needle-cylinder. These splines or feathers hold the nosing from moving when the ring $A^3$ is turned to raise it and serve as guides for the same in its vertical movements.

The upper face of the ring B is provided with an annular recess, as at $b$, to receive the lower end of the lower cam-ring C. Above the cam-ring C is another ring $B^2$, which is supported and held in a fixed position by standards D D. Ears upon the ring $B^2$ are provided with openings engaging the upper ends of the standards, and the latter are provided with nuts above and below the said ears, so that the ring can be adjusted to the position desired. The ring $B^2$ has an annular recess $b'$ similar to that in ring B to receive the lower end of the upper cam-ring C'. The ring $B^2$ has at one side a lateral extension $B^3$, to the under side of which is secured one or more suitable bearings for a driving-shaft E. A bracket $B^4$, secured to the bed-plate of the machine, extends outward beneath the shaft E and is provided at its outer end with a socket $d$. A bearing $d'$ for the outer end of the shaft E is provided with a short cylindrical stud which extends within the socket $d$ and is secured in the proper position by a set-screw. This shaft supplies motion when circular work is being done. This construction permits the adjustment of the outer end of the shaft E to the position desired or such adjustment as is made necessary by the adjustment of the ring $B^2$ upon its supporting-standards D. The driving-shaft E is provided with a beveled gear-wheel $e$, which gears with the gear-ring $c$ on the cam-ring C'. This shaft is also provided with a band wheel or pulley E', through which motion is imparted to the shaft by means of a band from the band wheel or pulley F' on the power-receiving shaft F, mounted on the supporting-frame of the machine near the base of the same. (See Fig. 1.) Cam-ring C is provided with a gear-ring $c'$, which is engaged by a beveled gear-wheel $g$ on shaft G, mounted in bearings below the bed-plate of the machine. Shaft G is also provided with a pinion $g'$, gearing with a spur-wheel $g^2$, mounted on a stud secured to the framing of the machine. The spur-wheel $g^2$ is given a reciprocating rotary movement by link $g^3$, connecting a crank-pin on said wheel with a crank-pin on the spur gear-wheel $h$ on shaft H. (See Fig. 2.) Rotary motion is imparted to the shaft H by a pinion $i$ on shaft I, which is provided with the band-pulley $i'$, which is driven by a band from band-wheel $F^2$ on shaft F. The power-receiving shaft F is provided with fast and loose pulleys $f f'$. Power is supplied to the machine by means of a belt from some source of power, and its engagement with the fast and loose pulleys is controlled in any usual manner.

In order to increase the production of the machine, I provide the upper cam-ring C' with two or more needle-operating cams. In this instance this ring is shown as provided with four of such cams 1, 2, 3, and 4. (See Fig. 14.) To the outside of the cam-cylinder I secure four thread-guides $k\ k\ k\ k$, and in order that the threads may be supplied thereto evenly and without becoming entangled I provide a rotary bobbin or spool carrier above the needle-cylinder.

To the extension $B^3$ of the ring $B^2$ is secured the hollow standard K. (See Figs. 1$^a$, 1$^b$, 5, and 6.) A bracket K' is secured to the top of this standard, which extends at one side above the needle-cylinder and has a circular opening therein. A shaft $K^2$ is located within the standard K, which is provided at its lower end with a bevel-pinion $k'$, (see Fig. 10,) gearing with a bevel-gear $e'$ on the shaft E. The shaft $K^2$ above the bracket K' is provided with a spur-gear $k^2$, which gears with a spur-wheel $K^3$, having a downwardly-extending annular flange engaging the circular aperture in the bracket K'. On this gear-wheel $K^3$ is mounted the spider $K^4$, which is provided with bobbin or spool holding pins $l\ l\ l$, (see Fig. 1$^b$,) forming a bobbin-carrier. This bobbin-carrier is carried or maintained in operative position by the bracket K', which is a support for the bobbin-carrier and the other parts held above the needle-cylinder. The center or hub of the gear-wheel $K^3$ is provided with an aperture in which is rigidly secured a rod or tubular standard L, near the top of which is secured the spider L', carrying thread guides or loops $l'$. Tension devices for the different threads may be secured to this spider, if desired or found advantageous.

The tubular standard L extends below the bracket K' and a short distance below said bracket is provided with the disk $L^2$, having thread-guiding eyes or apertures $l^2$. The bobbins for supplying thread for the upper cam-cylinder are placed upon four of the pins $l$ on the spider $K^4$, and the threads therefrom extend upward through the eyes $l'$ and such tension devices as may be employed, thence downward through the apertures in the gear-wheel $K^3$, formed by the arms connecting the hub and rim of the wheel, as shown in Fig. 5, thence through apertures $l^2$ in the disk $L^2$, and thence to the thread-guides $k$ and the needles in the usual manner. The operative connections are such that the spider and disk are driven at the same rate of speed as the cam-ring and its attached thread-guides, and as the threads are kept separated and are held in one constant relation to the thread-guides of the cam-ring all danger of twisting and entangling is avoided.

The thread is supplied for reciprocating work by other parts coacting with some of the instrumentalities just described, as follows: In the bed-plate of the machine is journaled the lower end of a shaft M, which is provided at its lower end with a gear $m^x$, engaging with the teeth of the gear-ring on the cam-ring C. To the under side of the bracket K' is attached the casing N, the horizontal wall $n$ of which is a short distance below the bracket, and a gear-ring N' rests loosely upon this wall of the casing within the recess formed thereby between the same and the bracket K'. To the bracket K' is secured a bearing $m'$, in which is journaled the upper end of the shaft M, which is provided with a pinion $m^2$, which extends through an opening in the casing N and engages the gear-ring N'. To the under side of this gear-ring is secured the reciprocating thread-guide driver, consisting of the downwardly-extending sleeve $N^2$ and the driver-rod $N^3$, loosely mounted within the same. The lower edge of the casing N is provided with an inwardly-extending flange $n'$. Between this flange and the gear-ring N' the sleeve is slotted on its outer side or on both its inner and outer sides, as shown, and a pin $n^2$, projecting from the rod $N^3$, extends through said slot or slots above the flange $n'$, so that when said rod is in its lowest position and the pin resting on said flange the rod will project below the end of the sleeve, as shown in Fig. 8. On the rod L, below the disk $L^2$, is revolubly mounted the reciprocating thread-guide carrier, consisting of the sleeve $N^4$ and the flat horizontal arm $N^5$. The under side of the arm $N^5$ is provided with the transverse lug $n^3$ and the laterally-extending lug $n^4$. (Best shown in dotted lines in Fig. $6^\times$.)

The thread-guide arm $N^6$ is pivoted to the lug $n^3$. The lug $n^3$ is slotted for the passage of a spring $n^x$, which is secured to the top of the thread-carrier arm $N^5$ and bears on the end of the arm $N^6$ when turned inward on its pivot, as shown in full lines in Fig. $6^a$, and bears on the side of upper end of the arm when in the position shown in dotted lines, and thus serves to hold the arm in either position. The arm extends downward opposite the hooks of the needles when in their most elevated position, where it is provided with an eye $n^5$ in proper position to deliver the thread to the needles for knitting. The arm $N^6$ is also provided with an aperture $n^6$ above the delivery-eye, and a short distance above this aperture it is provided with the inwardly-extending hooked arm $n^7$, forming a guide for the passage of the thread near its outer end. To the laterally-extending lug $n^4$ of the thread-guide carrier is secured a stud $n^8$, on which is mounted a spring-arm $n^9$, which extends downwardly and is provided at its lower end with a thread-engaging hook or loop to engage the thread between the guide $n^7$ and the thread-aperture $n^6$.

The gearing connecting the cam-ring C and the gear-ring $N'$ is such that the two are reciprocated together at the same rate of speed, and the rod $N^3$ coming in contact with one of the radial faces $n^{10}$ $n^{10}$ of the arm $N^5$ the thread-guide is moved thereby as long as the rod $N^3$ continues in engagement with the said arm. In order to move the thread-guide on its return movement, the rod $N^3$ must be released from its engagement with the arm $N^5$ before the end of its movement and caused to engage it on its opposite side. This is accomplished by the following means: The downwardly-extending wall of the casing N is provided with pivoted cams $o'$ $o^2$. (See Figs. 6 and 9.) A stationary part $o^3$ forms a continuation of the straight portion of the cam $o^2$. The upper surface of part $o^3$ rises higher than the straight portion of the cam $o'$. The wall $o$ is also provided with the stationary part $o^4$, of the same height as the cam $o'$, separated from the part $o^3$ by the inclined groove or passage $o^5$ and forming what I term the "driver-rod support."

The cam $o'$ is so located in respect to the gang of needles employed for reciprocating work that when the gear-ring and reciprocating thread-guide driver are moved toward the said cam as soon as the thread-guide has passed the last needle of the gang the pin $n^2$ will come into contact with said cam and be raised, thereby carrying the driver-rod $N^3$ upward out of engagement with driver-arm of the thread-carrier. As the movement of the parts is continued the pin passes over the cam and the driver-rod drops by gravity until the pin again engages and rests upon the flange $n'$, at which time the driver-rod has passed the arm $N^5$ of the thread-guide carrier. On moving in the opposite direction the driver-rod $N^3$ engages the opposite side of the carrier-arm $N^5$ and moves the thread-guide in advance of it in the opposite direction, the pin $n^2$ passing under the cam $o'$, which is raised by the pin to permit its passage. The driver-rod continues its movement, carrying the guide with it, until said guide has passed the last needle of the opposite end of the reciprocating gang of needles, when the pin $n^2$ comes in contact with the cam $o^2$ and the driver-rod is raised out of engagement with driver-arm of the carrier. As the cam-ring and connected parts continue their movement the pin $n^2$ passes over the cam $o^2$ and its extension $o^3$ and drops upon the driver-support $o^4$. As this support is of the same height as the cam $o'$, the driver-rod $N^3$ is held out of operative position in relation to the carrier-arm $N^5$. This is the position in which the parts are left at the close of reciprocating work, and it will be seen that the driver-rod will then be held out of position, so that the carrier-arm $N^5$ can pass beneath it. When the cam-ring $C'$ and the gear-ring $N'$ are given a reverse movement, the pin $n^3$ comes against the inclined end of the extension $o^3$ and is caused to follow the groove or passage $o^5$ until the pin rests upon the flange $n'$, which it does before the thread-carrier driver reaches the carrier-arm $N^5$. The driver-rod $N^3$ is then in position to engage the driver-arm and move the thread-guide in advance of the knitting-cam, as before described, until it is again raised by cam $o'$. The slack of the thread produced by the reversal of the thread-guide is taken up by the spring-tension arm $n^9$.

The movement given the reciprocating thread-guide is of such a limited extent that the thread-guides for circular work can remain stationary between the extremes of its movement.

The sleeve $N^4$ is adjustably secured to the rod L by collars $l^2$ $l^3$, held in position by set-screws. In order to prevent the thread-guide carrier from turning too far by momentum or other cause, I provide the end of each collar engaging the sleeve with the annular recess $o^6$, in which I place a stop or stop-pin $o^7$. The sleeve $N^4$ is provided at one end with a stop-pin $o^8$ and at the other a stop-pin $o^9$, which enter these recesses. The sleeve is permitted to move in either direction until one of the stops $o^7$ is engaged by one of the pins secured to the sleeve. As the collars are independently adjustable, one can be set in such position that when the reciprocating thread-guide has reached its limit of movement the stop-pin of one collar will be in a close relation to one of the pins on the sleeve, and when the thread-guide has reached its opposite extreme of movement the stop-pin of the opposite collar will be in close relation to the other pin on the sleeve. By this means the thread-guide is freed from all liability to error through overmovement. The thread for the reciprocating thread-guide will be supplied from a bobbin on one of the pins $l$ on the spider $K^4$ down through the gear-wheel $K^3$ or may be conducted downward through the tubular standard L and thence to the thread-eyes of the guide, as indicated in Fig. $6^a$.

The needles which I employ in my present machine are in most particulars of the same construction as those of my former application and are shown in Figs. 11 and $11^a$, in which A A are the fashioning-needles, or those needles which are thrown out of and into operation during narrowing and widening. A A' are the needles intervening between the fashioning-needles, and these two classes of needles form the gang for reciprocating work. The needles A $A^2$ are those which are in operation during circular work. All of the needles are provided with nibs $a$ $a$ for engagement with the cams of the cylinder C' for circular work. The needles A A' and A A are all provided with nibs $a$ $a'$ for engaging with the cam of cylinder C for reciprocating work, and the needles A A are provided in addition with shoulders $b$ $b$, $b$ $b'$, which are engaged by the pickers or shifter-slides to throw them out of and into operative position in narrowing and widening, as explained in my former application. The pickers or shifter-slides engage with the shoulders $b$ $b$ to raise the needles out of operative position and engage the shoulders $b$ $b'$ to return them to operative position.

It will be seen that as all of the needles are provided with nibs $a$ $a$ when the cam-cylinder C' is rotated all of the needles will be actuated by its cam-grades, and also that as those forming the reciprocating gang only are provided with nibs $a$ $a'$ only those having such nibs will be actuated by the cam-grades of the cylinder C during reciprocating work.

In order that the fashioning-needles may retain the position to which they are moved by the shifter-slides or pickers, I give them a small amount of curvature longitudinally, as shown at the left in Fig. $11^a$. The other needles of the machine may be given the same form, if desired. The same result can be accomplished by giving the jack of the needle a slight twist on its longitudinal axis, as shown at the right in Fig. $11^a$.

The shifter-slides or pickers $p^2$ $p^3$ of my present machine are of the same form and shape as in my said former application and they are supported in the same manner in two grooved standards or uprights $P^2$ $P^3$, extending upward from two rings P P'. The casing B' is provided on its interior with two grooves $p$ $p'$, in which said rings are movably supported. (See Fig. 13.) These rings are provided on their outer sides with worm-gear teeth. A portion of the casing is broken away, and on each side of the opening are mounted the bearings $q$ $q'$ for the worm-shafts Q Q', which are so mounted therein as to bring the worms into engagement with the gear-teeth on the rings P P'. (See Fig. 2.) The picker-guides $P^2$ $P^3$ are secured to the rings, as shown in Fig. 13.

The worms Q Q' are actuated to move the rings P P' step by step to bring the pickers successively into engagement with the proper needles for both narrowing and widening by the following combination of parts: The shafts of the worms Q Q' extend considerably beyond the bearing $q'$, and on the shaft of the lower worm Q is pivoted the angular reversing-lever R. On this lever are studs $r$ $r'$ $r^2$, on which are mounted two series of gears connected with the worm-shafts. One of these series consists of the gear-wheels $s$ $s^2$ $s^4$, which are connected with pinion $r^3$, rigidly secured to the shaft of the worm Q. The other series $s'$ $s^3$ $s^5$ connect with a pinion $S^4$ on the shaft of worm Q', through the intervention of pinion $s^6$, loosely mounted on the shaft of the worm Q. The shaft H at this side of the machine is provided with the toothed segments R' $R^2$. The teeth of the segment R' are in line with the series of gears $s$ $s^2$ $s^4$, and the teeth of the other segment in line with the gears $s'$ $s^3$ $s^5$. The gears $s'$ $s^3$ and $s$ $s^2$ are so located on the reversing-lever R that when the lever is in the position shown in Fig. 3 if the shaft H is rotated the segments will alternately engage gears $s$ and $s'$; but if the lever be raised a short distance the segments will engage with gears $s^2$ and $s^3$.

On the shaft H, beneath the reversing-lever R, is loosely mounted the pattern-disk S, having its periphery divided in two parts $s^8$ $s^9$, one part being higher than the other, the two parts being of equal extent. The lever R is provided with the downwardly-extending projection $r^x$, which rests on the periphery of the pattern-disk S. When the projection $r^x$ is in contact with the lower portion $s^8$ of the periphery of the disk, the segments R' $R^2$ will engage with wheels $s$ and $s'$, and when it rests on the higher portion $s^9$ of the periphery of the disk the segments will engage the gears $s^2$ and $s^3$. A gear-wheel S' is made integral with or attached to the disk S. Above the shaft H, I mount a shaft T, which is provided with a pinion $t$, gearing with wheel S'. Secured upon this shaft to revolve therewith is a sprocket-wheel T', carrying a tappet-chain $t^2$. This sprocket-wheel is moved the distance of one tooth at a time by the pin $h^x$ in the disk H' on the shaft H, one such movement being given for each revolution of the shaft H. In order to prevent undue or over movement of the shaft T by the pin $h^x$, the shaft T is provided with the notched disk $T^2$. The notches correspond with the teeth of the sprocket-wheel, and a spring-detent (not shown, but similar to detent $s$ $s'$, hereinafter described) engages with the notches of the disk and arrests the motion of the shaft T when it has been moved the proper distance.

The tappet-chain $t^2$ is provided with the projection or tappet $t^3$. An inwardly-extending arm $R^3$, rigidly secured to the lever R, is provided in line with the tappet-chain with a tappet-arm $R^4$, extending rearwardly into the path of the tappet $t^3$. When the tappet-chain has been turned so that the tappet $t^3$ engages with the tappet-arm, the lever R and its attached parts are raised so that the projection $r^x$ will be a short space above the higher portion $s^9$ of the disk S.

The pinion $i$ is mounted loosely upon the shaft I and is provided with a clutch member, and a movable clutch member $i^x$, splined upon the shaft, is provided with a groove $i^2$, which is engaged by a fork secured to the shipping-lever I', pivoted to the rear edge of the bed-plate of the machine. Beneath the bed-plate of the machine a rock-shaft J is mounted in suitable bearings, (see Fig. 2,) which has an arm $j$ secured thereto, and a link $j'$ connects this arm with the lower end of the shipping-lever I'. A spring $j^2$, having one end secured to the frame of the machine, is connected with the link $j'$ or other part, so that when not otherwise controlled the parts are held thereby in such position as to maintain the members of the clutch out of engagement with each other and the narrowing and widening devices out of operation. The forward end of the rock-shaft is provided with a hand-lever $j^3$, by which it can be moved when desired to throw the clutch members into engagement, and the link $j'$ is provided on its upper side with a notch $j^4$. A sliding detent-rod J' is movably mounted in suitable bearings, so as to be movable vertically therein over the link, and when not otherwise controlled rests upon the link, so that when the link is moved to bring the clutch members into engagement and notch $j^4$ beneath it the rod drops into said notch by gravity and retains the link and clutch members in that position. The detent-rod J' is provided with an arm $j^5$, rigidly secured thereto in the path of the rear end of the lever R or of a projecting part secured thereto. This arm $j^5$ is so located that when the projection $r^x$ rests upon the higher portion $s^9$ of the disk S it is a short distance above the end of the reversing-lever R; but when the lever is raised by the tappet of the chain $t^2$ it will be engaged thereby and the lower end of the detent-rod be lifted out of the notch $j^4$ of the link $j$. As soon as the tappet $t^3$ has passed beneath the arm $R^4$ the lever R will descend a short distance, bringing the projection $r^x$ onto the higher part of the disk S.

The projection $r^x$ of the lever R is normally on or above the forwardly-moving end of the higher part $s^9$ of the disk S, and on the narrowing and widening devices being put in motion by causing the clutch members to engage the wheels $s^2$ $s^3$ will be in position to be engaged by the sectors R' $R^2$, and the worms or screws Q Q' will be moved continuously step by step in one direction until the part $s^9$ of the disk passes from under the projection $r^x$, when the lever R will drop, bringing the projection upon the lower part of the disk and the wheels $s$ $s'$ into position to be operated by the sectors R' $R^2$, and the motions of the worms or screws Q Q' will be given a continuous movement step by step in the opposite direction until the tappet engages the arm $R^4$, when the lever will be raised, shipping mechanism released, and the machine stopped. The parts will then be in or nearly in position to repeat the same series of movements on throwing the clutch members again into engagement with each other.

In order to prevent undue movement of the gears $s^2$ $s^3$ and the train of gears connected therewith, each of the gears $s^2$ $s^3$ is provided with a disk at one side of the same which is notched on opposite sides, as shown in Fig. $3^a$ at $s$ $s$, and a spring-actuated detent $s$ $s'$ is provided to engage with said notches. The sectors R' $R^2$ are each provided with just a sufficient number of teeth to turn the gears with which they engage just one-half of a revolution, so that the gear is moved from one notch to the other, the detent coming into engagement with the notch after each movement holding it against overmovement from momentum.

The pickers or needle-shifters $p^2$ $p^3$ are of the same form and are mounted in the same manner as in my former application, hereinbefore referred to, and they are moved to effect the raising of the fashioning-needles out of operative relation with the cam for reciprocating work by two cams $C^3$ $C^4$ (see Fig. 15) on the inside of the cam-cylinder C. These cams are movable and are located at each side of the cam $C^2$ for operating the needles for reciprocating work. This latter cam may be of the form shown or any other form of reversible cam. These picker-cams operate upon the pickers at each stroke of the cam-cylinder, one in advance of the needle-cam and the other in the rear of it. Supposing the needle-cam $C^2$ and the picker-cams to be at the right of the reciprocating gang of needles, the position it would occupy at the commencement of the series of movements to form the heel, on motion being imparted to the operating mechanism for reciprocating work before the cam-cylinder shall have moved far enough for the picker-cam to engage the picker at that side of the machine the picker will be moved under the shoulder of the first needle of the fashioning group and the picker-cam in advance of the needle-cam will actuate the picker and throw the needle out of position, so that no stitch will be knit thereon. The picker-cam following the needle-cam will also raise the picker; but as the needle has already been raised this movement of the picker will produce no result. On the return movement of the cam-cylinder before it will have moved far enough for the picker-cam now in advance of the needle-cam to engage the picker at that side of the machine the picker will be moved under the shoulder $b\,b$ of the first fashioning-needle at that side of the machine and the said cam will actuate the picker and raise the needle. The picker which follows the needle-cam will move the picker; but as the needle has been raised no effect is produced thereby. On the next movement of the cam-cylinder from right to left another needle will be raised at the right side of the machine, and so on until all of the fashioning-needles have been raised. The reciprocation of the cam-cylinder $C'$ is continued until the pickers have been advanced one step each from under the needles raised. The cams $C^3$, $C^4$, and $C^5$ are then raised simultaneously, which throws the cams $C^3$ and $C^4$ out and brings the cam $C^5$ into operation. The cam $C^5$ being located on the cylinder approximately opposite the needle-cam at the time it is raised it will be under the needles which intervene between the two groups of fashioning-needles. On the first movement of the cylinder the needle-cam will be moved from right to left and the picker-cam being opposite will move in the opposite direction. At the same time that the cams are shifted the motion of the picker-carriers will be reversed by the projection $r^x$ dropping from the higher to the lower part of disk S, and as the needle-cam moves toward the needles the picker at the right side of the machine will be reversely moved one step, bringing it above the shoulder $b\,b'$ of the fashioning-needle last raised on that side of the machine. The picker-cam in the course of its movement will first engage and move the picker at the left of the machine; but as it is not in position nothing is effected thereby. The cam-cylinder makes substantially one revolution at each reciprocation, and as the picker-cam passes the picker on the right side of the machine it will operate it and depress the needle with which it is in alinement, bringing it again into operative relation with the cam $C^2$. On the return movement of the cylinder the picker at the left will be brought over the shoulder $b\,b'$ of the fashioning-needle last raised at that side of the machine, and the picker-cam near the end of that movement of the cam will actuate the picker and depress that needle, bringing it again into operation. The cam-cylinder will continue its movement until the pickers have been each moved one step from the reciprocating gang of needles, when the tappet on chain $t^2$ will raise the lever R, causing it to raise the detent-rod, and enabling the spring $j^2$ to withdraw the clutch members on shaft I from engagement with each other and stop the machine. The stopping is effected at the end of a movement of the needle-cam from left to right, and said cam and the picker-cams $C^3\,C^4$ will be under the gang of needles, which remain at rest during the reciprocating work, while picker-cam $C^5$ is beneath the needles intervening between the two groups of fashioning-needles. These cams are therefore in such position as not to interfere with circular knitting. In this position of parts the pin $n^2$ of the driving-rod of the reciprocating thread-guide driver has been raised by the cam $o^2$ past the extension $o^3$ and dropped upon the support $o^4$, by which it is supported and by which it is held out of operative position, so that the arm $N^5$ of the thread-guide can pass freely beneath it.

In order to secure the movement of the pickers at the proper moment to secure the throwing of the needles into and out of operation, so as to prevent faults in the knitting, I have found it best to advance the pickers at the times stated; but it will be observed that the toothed segments $R'\,R^2$ are not diametrically opposite each other on shaft H, but that the radii of the two arms are in intersecting planes. As a result the picker at one side of the machine will be moved into place farther in advance of the needle-cam than the other. I arrange that the segment $R^2$ shall effect the movement of the picker at the right side of the machine and at a less distance in advance of the needle-cam than that effected by the segment $R'$ at the other side of the machine. This is rendered necessary by reason of the fact that the change or reversal of motion by the movement of the lever R throwing the gears $s^2\,s^3$ out of the range of the segments and bringing $s\,s'$ into position to be operated by them takes place when the needle-cam has reached its extreme of movement to the right. If the said segments were diametrically opposite each other, the segment would be in the way of the gear coming into position at that time, and the teeth of the gear and segment might strike against each other and not properly engage, thus producing faults and imperfect knitting and causing accidents to the machine. By setting the two segments so that their radii occupy intersecting planes I provide for the dropping of the lever and gears before the toothed segment $R^2$ is in position to engage its appropriate gear.

The cams $C^3$, $C^4$, and $C^5$ are automatically put into and out of position to act upon the pickers by the following means: These cams are movable vertically in any well-known way and are each provided with a pin $c^x$, extending to the outside of the cam-cylinder, and frictional means for retaining the cams in the position desired. In this instance I provide each pin with a coiled spring interposed between an enlarged portion of the pin and a thin plate $C^x$ on the outside of the cylinder and which is pressed by the spring against the exterior of the cam-cylinder. Any other means for this purpose might be employed. A rod Z is mounted for vertical movement in the ring B. To this rod is rigidly but adjustably secured an arm $Z'$, extending inwardly toward the cam-cylinder C and at its inner end provided with a cam or shifter plate $Z^2$, (See Figs. 1ª and 13.) This shifter-plate is of the form shown in Fig. 1ˣ. The rod Z extends downward below the bed-plate of the machine and rests upon the forward end of the tappet-lever $z$, pivoted at $z^2$ to a bracket-arm $Z^x$, secured to the under side of the bed-plate of the machine. A spring $z'$ surrounds the rod Z between the bed-plate and a pin $z^3$, passing through the rod, and tends to keep the rod and tappet-lever in their lower position. The tappet-lever $z$ extends over the inner end of the arm $R^3$ of the lever R and a tappet $R^5$, mounted thereon. The arrangement is such that if the lever R is raised the tappet $R^5$ engages the tappet-lever $z$ and raises the lever and the rod Z. In order to prevent the arm $Z'$ from turning rod Z or from turning thereon in the act of shifting the picker-cams, I provide the bed-plate with a vertical guide $Z^3$, which passes through an opening in the arm $Z'$ and guides it in its movements up and down and holds it firmly in place. When the lever R drops to its lowest position, the rod Z will be released by the tappet and the spring will return the tappet-lever, rod, and shifter-plate to their lower position. In its lower position the shifter-plate is in such a position that if the cams $C^3$, $C^4$, and $C^5$ are in their highest position the shifter-pins of these cams will pass over the shifter-plate; but if the cams are in their lower position the pins will engage with one of the inclines on the upper side of the plate and the cams be raised to their highest position. When the shifter-plate is in its highest position, if the cams $C^3$, $C^4$, and $C^5$ are in their lowest position the shifter-pins of the cams will pass below the shifter-plate; but if the cams are in their highest position the shifter-pins will engage one of the inclines on the lower side of the shifter-plate, and the cams will be thereby depressed to their lowest position.

I have heretofore described the means for stopping the mechanism in operation during reciprocating work at the proper time in the operation of making a stocking. I will now proceed to describe the means which I employ to effect the stopping of the mechanism in operation during circular work at the appropriate intervals. It is to be understood that while these devices automatically stop the machine, it will be necessary to set it in operation, unless the construction hereinafter described be also employed. The shaft E, about midway, is provided with a worm W, which meshes with and actuates worm-wheel $W'$. This worm-wheel is rigidly secured to a sleeve X, revolubly mounted on a stud $X'$, secured to a bracket Y, depending from the extension $B^3$ of the ring $B^2$. On the other end of the sleeve X is secured a sprocket-wheel $W^2$, carrying a tappet-chain provided with tappets of the form shown at $w^6$, Fig. 28, in the drawings. The band-wheel $E'$ on the shaft E is loosely mounted on the shaft and has the inner end of its hub provided with a clutch member. The main body of the clutch $E^2$ is splined upon the shaft E and is provided with a corresponding clutch member to engage with the clutch member on the hub of the band-wheel at two points of its revolution. The clutch-body $E^2$ has a circumferential groove, and this groove is engaged by a fork secured to one end of a shipper-rod $E^3$, mounted to slide in bearings $B^{44}$ on the under side of the extension $B^3$ of the ring $B^2$. A spring $E^4$, Figs. 16 and 1ª, is secured to the shipper-rod and to a stationary part of the frame and tends to move the shipper-rod in a direction to separate the clutch members. The shipper-rod is provided with a projection (not shown) by which it can be moved by the hand of the operator to place the clutch members in engagement with each other, and it is also notched on it upper side at $y^7$ to receive a pawl or detent $y$ to retain it in that position. The pawl or detent $y$ is held in contact with the shipper-rod or in the notch upon the same by a spring $y'$. The detent $y$ extends forward and is provided with a depending arm $y^2$, which has a projection $y^3$ (see Fig. 1ª) extending into the path of the tappets $w^6$ on chain $W^4$. The construction is such that when a tappet comes in contact with the arm $y^2$ of the detent it raises the latter out of the notch in the shipper-rod and permits the spring $E^4$ to separate the clutch members and stop the machine. The tappets $w^6$ on the chain are arranged upon the chain, so that one serves to raise the pawl or detent $y$ and stop the machine when the leg of the stocking has been completed, and another is so located as to release the clutch when the foot has been completed. I usually term one the "leg-tappet" and the other the "foot-tappet." When this construction operates in connection with the automatic devices, the tappets $w^6$ will act to raise the detent $y$ at the same time that the proper tapper raises the shaft D D.

In order to enable the needles to be all raised at one time and be held securely in that position while work is being run on—that is to say, while incompleted work of another machine is having its loops placed upon the needles—I employ the construction shown in Figs. 21, 22, 23, and 24. In employing this construction the depressing cam or cams of the cylinder $C'$ are made vertically adjustable, and one cam is shown in these figures for convenience of illustration; but it is to be understood that any number of cams may be employed and be mounted in the same manner. The cam 1ª is movable vertically in the usual manner. The pin $c\,c$, secured to the cam and extending through the cylinder $C'$, is provided at its outer end with a head. A sleeve $c\,c'$ is movably mounted on the pin. This sleeve at its inner end has an opening closely embracing the smaller part of the pin $c\,c$, but throughout the greater portion of its length is bored to receive the head of the pin. A spring $c\,c^2$ is interposed between the head of the pin and the bottom of the bore of the sleeve, which tends to force the sleeve inward against the cylinder C'. The tension of the spring is sufficient to hold the cam when in its elevated position. In order to secure it in its lower or operative position, I provide the outside of the cylinder with a circular recess or countersink $c\ c^3$ to receive the inner end of the sleeve $c\ c'$. When the cam is drawn down to operative position, the spring forces the end of the sleeve into the countersink $c\ c^3$ and the cam is held from movement. When the cam is raised by turning the cylinder C', the lower cam-grades $2^a\ 3^a$ will raise all of the needles to one level. Cam $1^a$ is shown as of slightly different form from that of cams 1 2 3 4; but it may be of the same construction, if preferred. Both forms of cams are old in the art. In order that the needles so raised may be securely held while work is being run on, I provide a needle-retainer. This consists of the sectors $d\ d$, which extend into the space between the cam-cylinder C' and the needle-cylinder and form a needle-holder. Each sector is provided with a stem $d\ d'$, which extends outwardly through a guiding recess or slot in the cylinder, preferably formed as a groove in the lower flanged edge of the upper part of the cylinder. The flange of the lower part of the cylinder is provided with an annular groove $d\ d^2$, in which is fitted the annulus $d\ d^3$, provided with the cam-slots $d\ d^4$. Each of the sectors extends over the cam-annulus and is provided with a pin engaging a slot in the same. The annulus is provided with a handle $d\ d^5$, which extends beyond the flanges of the two parts of the cam-cylinder C', by which it can be moved to the right or left to throw the sectors inward or outward. Each of the machine-needles has the nib $a\ a$, provided with a shoulder $a\ a^2$ to be engaged by the sectors. When the machine is in operation, the handle of the annulus will be turned to the right and the sectors drawn outward, in which position they will be free of the needles and the cam $1^a$ will be in its lower position. When it is desired to run on work, the cam will be raised, the cylinder turned until all the needles are raised, the handle of the annulus will then be turned to the left, and the sectors forced inward under the shoulders $a\ a^2$, when the needles will be locked against downward movement and the work of running on the work facilitated. A reversal of these movements will put the machine in condition for operation.

My perfected machine is provided, in addition to the stopping devices hereinbefore described, with means which cause those devices to automatically stop the part of the mechanism for circular work and put in operation the mechanism for reciprocating work and to automatically stop the mechanism for reciprocating work and start the mechanism for circular work. By this means the work of the machine is made practically continuous and the operator enabled to attend to a large number of machines, thereby cheapening the cost of production In carrying out this feature of my invention I employ, in connection with the devices already described, the following instrumentalities: In suitable bearings at the front of the machine I mount a vertical shaft D D, which I term a "change-shaft," (see Figs. 17, 18, and 19,) so as to be capable of rocking and sliding in the same. To the upper end of this shaft I secure an arm D D', which extends toward the cylinder C into the path of a trip-arm $C^y$, secured to the cylinder, so that when the change-shaft D D and the arm D D' are raised the arm will be brought within the path of the tripping-arm and be engaged thereby. I also provide the change-shaft with a tappet arm or projection $w\ w$, which extends toward the tappet-chain $W^4$ and into the path of a tappet $w^4$ on the chain. This tappet-arm is secured rigidly to the change-shaft D D, and I prefer to accomplish this by mounting on the shaft a collar $w\ w'$, provided with the projection $w\ w$, and secure this rigidly to the shaft by a set-screw, thus providing means for adjustment when this may be desired. The shaft D D is also provided with an arm $e\ e$, secured rigidly thereto. A link $e\ e'$ connects this arm with the shipper-rod $E^3$ or with the fork controlling the movable member of the clutch $E^2$. The shaft D D at its lower end is further provided with another arm $e\ e^2$. (Shown in dotted lines in Fig. 19 and in elevation in full lines in Fig. 17.) The arms $e\ e$ and $e\ e^2$ are preferably adjustably secured to the shaft. The arm $e\ e^2$ is connected by a link $J^2$ with the arm $j^3$ on the rock-shaft J or with another upwardly-extending arm connected with said shaft, as shown in dotted lines in Fig. 17 and designated by reference-letter $j^x$. The tappet-chain $W^4$ is provided with tappets $w^4$, which may correspond with the tappets $w^6$, hereinbefore described—that is, be made to occupy such positions that they will begin to act at the same time. When a tappet comes in contact with the tappet-arm $w\ w$, the shaft D D is raised thereby until the arm D D' is brought into the path of the tripping arm or projection $C^y$, when it is struck by the tripping-arm and the shaft turned thereby. By this movement the link $e\ e'$ is drawn inward, separating the members of the clutch $E^2$ and stopping the parts operating together for circular knitting. At the same time the arm $e\ e^2$ of the shaft forces the link $J^2$ to the left, turning the rock-shaft J, and by link $j'$ and shipper-lever I' forcing the clutch members on shaft I into engagement, bringing the parts which operate together for reciprocating work and narrowing and widening into operation. In doing this the notch $j^4$ in the upper edge of the link $j'$ is brought under and is engaged by the shipper-rod J'. The machine immediately proceeds to first narrow and then widen, upon the conclusion of which the tappet on the chain $t^2$ raises the shipper-rod, as hereinbefore described, and the spring $j^2$ disengages the clutch members on shaft I and turning shaft J by means of arm $j^x$ and link $J^2$ turns the shaft D D and brings the members of clutch $E^2$ into engagement for circular knitting. In order to secure the return of the shaft D D to its lower position and the withdrawal of the arm D D' from the path of the trip-arm $C^y$, I employ a spring to assist the action of gravity in doing this. This spring may be used in any convenient way. I prefer, however, to employ the construction shown in Fig. 18. A sleeve D $D^2$ extends downward through an opening in the ring B and is secured in position in any desired manner. The upper end of the sleeve D $D^2$ is provided with an opening for the passage of the shaft D D, and within the lower part of the sleeve a collar D $D^3$ is secured to the shaft by a set-screw or other means, and a spring D $D^4$ is placed around the shaft between the collar and the upper end of the sleeve. The collar $w\ w'$ is so placed as to limit the downward movement of the shaft, and the spring tends to maintain it in its lower position and to return it when released from the tappet of the chain $W^4$. In order that the machine shall stop after a certain amount of circular work and after narrowing and widening, all that is necessary is to detach the link $J^2$ from the arm $e\ e^2$. If preferred, the link $e\ e'$ may also be disconnected from the devices controlling clutch $E^2$. In addition to these automatic work-changing devices I provide a means whereby the machine may be stopped after a web of a certain length has been knit, which may correspond with the amount of yarn on a single bobbin when this may be desired. The shaft F is, as hereinbefore described, provided with a loose pulley $f'$ and a fast pulley $f$ to receive a band from some source of power. Above the shaft F, I mount a sliding bar $F^3$, provided with a belt-shipper $F^4$. A spring $F^5$ encircles the bar $F^3$ and, pressing against a collar $f^3$, tends to force the belt-shipper in a direction to transfer the belt from the fast pulley $f$ to the loose pulley $f'$. A rock-shaft $F^6$ is provided with a downwardly-extending arm $f^4$, which has a slot at its lower end engaging a pin $f^x$, rigidly secured to the shipper-bar $F^3$. At the front of the machine, Fig. 26, the shaft $F^6$ is provided with an arm $f^5$, which has a broad upper end which is provided with a notch $f^6$. Upon the top of the bed-plate is pivoted the detent-lever $F^7$, which has one arm $f^7$, adapted to engage the notch $f^6$ of the arm $f^5$ of the rock-shaft $F^6$. The lever $F^7$ has also another arm $f^8$ extending at an angle thereto, which is caused to extend within the path of certain tappets $w^5$ on the tappet-chain $W^4$. The tappet-chain $W^4$ is made of sufficient width to carry one, two, or three series of tappets, and when it is provided with the latter number I prefer to form them as shown in Fig. 28. The tappet $w^4$ is designed for operating the change-shaft and is arranged, as shown, so that it will not engage the detent $y$, while the tappet-arm $w\ w$ is so located, Fig. 19, that the other tappets will pass said arm without coming in contact with it. The tappet $w^5$ is of reverse form of construction and is placed as shown, so as to have a range of movement at the opposite side of the chain. Its location is such that it also will not come in contact with the detent $y$, while the detent-lever $F^7$ has its tappet-engaging arm so located as not to be engaged by the other tappets of the chain. The tappet $w^6$ is made, as shown, with its effective portion lying centrally of the chain between the tappets $w^4$ and $w^5$ and of a form not to engage the tappet-arm $w\ w$ of the change-shaft nor the detent-lever $F^7$, and the detent $y$ is also so constructed as not to be engaged by the tappet or tappets $w^4$ and $w^5$. It will be seen that all of these constructions can be embodied in one machine and yet the machine changed at any time, so that either of these stopping or changing devices may be thrown out of operation by removing the series of tappets which actuate or control it or by substituting a chain having on it only tappets to actuate the device or devices retained in use.

In case it is desired to knit half-hose by running on ribbed tops and knitting the remaining portion of the leg and foot it will be necessary to have the machine stopped after finishing each stocking, and in order to effect this the tappets $w^5$ will be placed in such positions as to accomplish this, the machine automatically effecting the changes necessary to knit the heel and toe.

The operation of my perfected machine will be apparent to every one conversant with the art of knitting seamless stockings. After knitting continuous circular work to produce the requisite amount of tubular fabric for the leg the tappets of chain $W^4$ raise the change-shaft and the detent $y$. The trip $c^y$ thereupon engages the arm D D' of the shaft and through its connections opens the clutch $E^2$ and brings the clutch members on shaft I into engagement, thereby setting the reciprocating mechanism and the narrowing and widening devices into operation. The automatic changing devices also bring the reciprocating thread-guide into operation. The thread-guides for circular work remain stationary during the operation of narrowing and widening; but they are left in such a position that they do not interfere with the movements of the reciprocating thread-guide, as the movement imparted to the latter through the means of its driver is so arranged as to avoid its coming into contact with them. As soon as the heel has been formed the tappet-chain $t^2$ raises the shipper J' and the spring $J^2$ opens the clutch on shaft I and through its connection turns the change-shaft and causes the reëngagement of the members of clutch $E^2$, reëstablishing circular knitting. At the close of the operation of widening the thread-guide driver is left with its pin $n^2$ resting upon the driver-support $o^4$, holding the rod $N^3$ above the arm $N^5$ of the thread-guide carrier. As the tubular rod L is revolved with the gear $K^3$ the reciprocating thread-guide revolves with it, passing beneath the driver-rod $N^3$. The reciprocating thread-guide maintains its position relative to the needles; but as the needles have to be raised to engage with the thread and there is no needle-cam now operating in connection with this guide the thread passes above the tops of the needles and is not knitted into the fabric. As soon, however, as the change to reciprocating work is made and the reciprocating cam is put into operative relation with the thread-guide the thread carried thereby is taken by the needles in operation during reciprocating work, as has already been explained.

The machine can be operated to stop between circular and reciprocating work and between reciprocating work and circular work by disconnecting the link $J^2$ from the arm $e\ e^2$. In such case the tappets $w^4$ may be removed from chain $W^4$ or a chain employed which is not provided with such tappets; but the removal or change of the chain is not absolutely necessary. By these means my machine is given a capacity for a greater variety of work than it would otherwise be capable of.

While I have shown the best forms in which I have contemplated embodying my invention, it is evident that many of the constructions might be changed without departing from the principle of my invention.

It may sometimes be desirable when the machine is running continuously with the automatic changing devices in operation to provide against errors in the work which would be occasioned by the operator failing to supply fresh bobbins before those supplying the machine are exhausted. In such case a long chain can be employed and provided with the necessary tappets $w^4$ and $w^6$ and at the proper intervals for the renewal of the bobbins with tappets $w^5$, which will stop the machine, and thereby call the attention of the operator to the necessity of supplying fresh bobbins. By this means a single operator will be enabled to have the oversight and control of a large number of machines, thereby effecting a material reduction in the cost of production.

In the foregoing description where "needle-cams" have been referred to it is to be understood that by the term "needle-cam" is meant the construction or arrangement of grades which will produce a single row of stitches at one revolution of the machine.

What I claim, and desire to secure by Letters Patent, is—

1. A circular-knitting machine substantially as herein described having a single circular series of needles, two or more needle-operating cams each of which engages the whole series of needles at each revolution of the machine, a needle-operating cam for reciprocating work, thread-supplying devices for circular and reciprocating work, the devices supplying thread for reciprocating work moving in unison with the cam past the needles then in operation, means for operating the machine for continuous circular work and for reciprocating work, and narrowing and widening devices operatively connected with parts moving during reciprocating work.

2. A circular-knitting machine substantially as herein described having a needle-cylinder and a single circular series of needles, two or more needle-operating cams each engaging all of said series of needles at each revolution of the machine during circular work forming two or more rows of stitches at each revolution, a needle-operating cam which is stationary during circular work, thread-supplying devices for circular and reciprocating work, the devices supplying thread for reciprocating work moving in unison with the cam past the needles then in operation, means for operating the machine for continuous circular and for reciprocating work and narrowing and widening devices operatively connected with parts moving during reciprocating work.

3. A circular-knitting machine substantially as herein described having a needle-cylinder and a single circular series of needles, two or more needle-operating cams each engaging the whole series of needles during each revolution of the revolving parts of the machine during circular work, a needle-operating cam for reciprocating work which is stationary during circular work, a thread-supplying device for reciprocating work moving in unison with the cam past the needles in action during reciprocating work, means for operating the machine for continuous circular and reciprocating work and narrowing and widening devices operatively connected with parts in motion during reciprocating work.

4. A circular-knitting machine having a single circular series of needles, three or more cams, two or more of which engage all of the needles of the said series during each revolution of the parts of the machine revolving during circular work and are stationary during reciprocating work, thread-supplying devices for circular and reciprocating work, means for operating the machine for continuous circular work, and means for operating the machine for reciprocating work including means for moving the reciprocating thread-guide in unison with the cam past the needles in operation during reciprocating work, substantially as described.

5. A circular-knitting machine having a single circular series of needles two or more needle-operating cams each of which engages with the whole series of needles on each revolution of the revolving parts of the machine during circular work, a reciprocating cam for reciprocating work which is stationary during circular work thread-supplying devices for the cams in action during circular work, a single reciprocating thread-supplying device which is reciprocated in combination with the reciprocating cam during reciprocating work, and operative means, substantially as described.

6. A circular-knitting machine having a single circular series of needles, two or more operating-cams each engaging the whole of said series of needles during a single revolution of the parts of the machine revolving during continuous circular work, a reciprocating cam for reciprocating work which is stationary during circular work, thread-supplying devices for circular and reciprocating work, means for operating the machine for continuous circular work and for reciprocating work and means for changing from one movement to the other and for bringing the proper thread-supplying devices into operation, substantially as described.

7. A circular-knitting machine having a single circular series of needles, two or more needle-operating cams each engaging all of said series at each revolution of the revolving parts of the machine during circular work, a cam for reciprocating work which is stationary during circular work, narrowing and widening devices including worm-gearing for moving parts from needle to needle, a reciprocating thread-supplying device, and operating mechanism for said reciprocating cam, thread-guide and worm-gearing whereby they are combined for joint movement, substantially as described.

8. A circular-knitting machine substantially as herein described having a single circular series of needles, two or more needle-operating cams engaging all the needles of the series during each revolution of the rotating parts of the machine during circular work, a reciprocating cam which is stationary during circular work, narrowing and widening devices including worm-gearing for moving parts from needle to needle, thread-supplying devices for circular work, and a reciprocating thread-guide for reciprocating work, actuating means for circular work and reciprocating work, means for changing from circular to reciprocating work adapted to bring the reciprocating thread-guide and worm-gearing into operation.

9. A circular-knitting machine substantially as herein described having a single circular series of needles, a plurality of needle-operating cams, two or more of which engage all of the needles of the series during each revolution of the rotating parts of the machine during circular work, forming two or more rows of stitches, one of its cams operating during reciprocating work, narrowing and widening devices coöperative with the cam in action during reciprocating work, means for actuating the machine for circular work, and reciprocating work, thread-supplying devices for circular work and a thread-supplying device for reciprocating work connected with the operative mechanism for the narrowing and widening devices and the reciprocating cam.

10. A circular-knitting machine substantially as herein described having a single circular series of needles, a plurality of needle-operating cams two or more of which each engage the needles of the said series at each revolution of the rotary parts of the machine during circular work, one of its cams operating during reciprocating work, narrowing and widening devices coöperative with the cam in action during reciprocating work, thread-supplying devices for circular and reciprocating work the devices supplying thread for reciprocating work moving in unison with the cam past the needles then in operation, and actuating mechanism.

11. A circular-knitting machine organized for circular and reciprocating work, having a single circular series of needles, three or more needle-cams, two or more of which each engage all of the said series of needles during each revolution of the rotating parts of the machine during circular work, a part of the needle-cams being out of operation during reciprocating work, automatic narrowing and widening devices including worm-gearing for moving and holding parts of such automatic mechanism from displacement, thread-supplying devices for circular work, a thread-supplying device for reciprocating work, actuating mechanism for circular work and mechanism actuating and operatively combining the reciprocating cam, worm-gearing and reciprocating thread-supplying devices, substantially as described.

12. In a circular-knitting machine the combination with the needle-cylinder and its needles, of two cam-rings one cam-ring having two or more cams each for engaging all of the needles for circular work producing two or more rows of stitches at each revolution of the machine and the other ring having a single cam for reciprocating work, thread-supplying devices for circular and reciprocating work, the devices supplying thread for reciprocating work moving in unison with the cam past the needles then in operation, and automatic narrowing and widening devices coöperative with the reciprocating cam-ring substantially as described.

13. In a circular-knitting machine the combination with the needle-cylinder and its needles of two cam-rings one cam-ring having two or more cams each for engaging all of the needles for circular work and the other ring having a single cam for reciprocating work, thread-supplying devices for circular and reciprocating work, automatic narrowing and widening devices, actuating means for circular work and actuating means for reciprocating work operatively combining the reciprocating cam-ring, its thread-supplying device and the automatic narrowing and widening devices, substantially as described.

14. In a circular-knitting machine the combination with the needle-cylinder and its needles, of two or more needle-operating cams each adapted to engage all of the needles for circular work but which are thrown out of operation during reciprocating work, a needle-cam operating during reciprocating work, thread-supplying devices for circular work, thread-supplying devices for reciprocating work, narrowing and widening devices, actuating devices for the cams for circular work and their thread-supplying devices and actuating devices for the reciprocating cam, its thread-supplying devices and the narrowing and widening devices, substantially as described.

15. A circular-knitting machine having two cam-cylinders, one provided with a plurality of needle-operating cams each adapted to engage all of the needles at one revolution of the rotary parts of the machine, the other cylinder having a cam for engaging a part of the needles for reciprocating work, thread-supplying devices for circular and reciprocating work, the devices supplying thread for reciprocating work moving in unison with the cam past the needles then in operation, narrowing and widening devices including worm-gearing and actuating mechanism, substantially as described.

16. In a circular-knitting machine the combination with the needle-cylinder, needles and two or more cams operative during circular work, of a bobbin-carrier and thread-guides for said cams moving in unison therewith, a cam operative during reciprocating work, a thread-guide moving in unison with said cam past the needles in operation during reciprocating work and actuating mechanism, substantially as described.

17. In a circular-knitting machine the combination with the needle-cylinder and needles, a cam-cylinder having two or more cams for circular work, thread-guides for said cams and a bobbin-carrier operatively connected with said cam-cylinder for movement therewith, of a cam-cylinder having a cam operative during reciprocating work, and an independent thread-guide operatively connected for moving in unison with said reciprocating cam-cylinder past the needles in operation at each course of knitting during reciprocating work, substantially as described.

18. In a circular-knitting machine the combination with the needle-cylinder, of the cam for reciprocating work, of the reciprocating thread-guide carrier and thread-guide driver, supported above the needle-cylinder and actuating mechanism operatively combining said reciprocating cam and thread-guide driver, substantially as described.

19. In a circular-knitting machine the combination with the needle-cylinder and the cam for reciprocating work, of a thread-guide driver supported above the needle-cylinder, and the thread-guide carrier, substantially as described.

20. In a circular-knitting machine the combination with the pivoted thread-guide carrier of the driver-rod and its operating-cams, substantially as described.

21. In a circular-knitting machine the combination with the pivoted thread-guide carrier, of the reciprocating driver-rod, its operating-cams and the driver-rod support, substantially as described.

22. In a knitting-machine the combination with the pivoted thread-guide carrier, of the adjustable collars provided with stops, the said carrier being provided with pins to engage the stops, substantially as described.

23. In a knitting-machine the combination with the thread-guide carrier, of the adjustable collars above and below the same provided with recesses adjacent to the carrier, and stops located therein, the said carrier being provided with stop-pins adapted to enter said recesses and engage said stops, substantially as described.

24. In a circular-knitting machine the combination with the pivoted reciprocating thread-guide carrier, of the driver-rod, its actuating-cams and the driver-rod support, having a passage between the same and one of said cams, substantially as described.

25. In a knitting-machine the reciprocating thread-guide carrier and actuating mechanism therefor comprising among its members a slotted tube, the rod movably located therein having a pin passing through the slot in said tube, substantially as described.

26. In a circular-knitting machine the combination with the needle-cylinder, needles and needle-operating devices, of a support located above said cylinder a bobbin-carrier, a reciprocating thread-guide carrier and thread-guide-driving means, said bobbin-carrier, thread-guide carrier and driving means being sustained in operative position by said support, substantially as described.

27. In a circular-knitting machine the combination with the cam or cams for circular work, a cam for reciprocating work which is stationary during circular work, mechanism for revolving parts of the machine for continuous circular work and mechanism for actuating the machine for reciprocating work, of automatic devices for changing from circular to reciprocating work, and from reciprocating to circular work, substantially as described.

28. A circular-knitting machine having two or more needle-operating cams, operative during circular work, a needle-operating cam operative to effect knitting during reciprocating work, which is stationary during circular work, actuating devices for circular and reciprocating work narrowing and widening devices coöperative with the cam in action during reciprocating work and automatic devices for changing from circular to reciprocating work, substantially as described.

29. In a circular-knitting machine the combination with the needle-cylinder, two cam-cylinders operating the needles for circular and reciprocating work and their actuating mechanism, of a tappet-chain and devices controlled thereby for changing from circular to reciprocating work, a tappet-chain and devices controlled thereby for changing from reciprocating to circular work, substantially as described.

30. In a circular-knitting machine the combination with two cam-cylinders one for circular and one for reciprocating work, of two independently-operated driving-shafts one for each cylinder, a clutch mechanism for each shaft, driving mechanism connected with both shafts, automatic devices for operating the two clutch mechanisms for throwing one shaft out of and the other shaft into operation, said automatic devices including a provision for stopping the driving means for said shafts, substantially as described.

31. In a circular-knitting machine the combination with the needle-cylinder, needle-operating devices for circular work and a trip connected therewith, of clutch mechanism controlling said needle-operating devices, the change-shaft connected with said clutch having a trip-arm normally out of the path of said trip and a tappet-chain adapted to bring said trip-arm into the path of said trip, substantially as described.

32. In a circular-knitting machine the combination with the needle-cylinder and needle-operating devices, of two shafts one for circular and one for reciprocating work, a clutch for each shaft, devices connecting the two clutches including a change-shaft and means for operating it to throw the shaft for circular work out of and the shaft for reciprocating work into operation, and a tappet-chain controlling the operation of said change-shaft, substantially as described.

33. In a circular-knitting machine the combination with a needle-cylinder and needle-operating devices for circular and reciprocating work and narrowing and widening mechanism, of two driving-shafts one for circular work and one for reciprocating work, a clutch mechanism for each shaft, a tappet-chain controlling each clutch mechanism, and connections between said clutch mechanisms whereby the one is held out of operative position when the other is in such position, substantially as described.

34. In a circular-knitting machine the combination with the knitting-cylinder, needle-operating devices for circular and reciprocating work, and narrowing and widening devices, of devices for automatically changing the machine from circular to reciprocating work including a tappet-chain, and of a power-receiving shaft, having fast and loose pulleys, a spring-actuated belt-shipper and connections between said belt-shipper and said tappet-chain for controlling said belt-shipper to automatically stop the machine, substantially as described.

35. The combination with the power-receiving shaft provided with fast and loose pulleys, of the spring-actuated belt-shipper, and the lever connections, the tappet-chain and pivoted detent controlling said lever connections, substantially as described.

36. The combination with the power-receiving shaft having fast and loose pulleys, of the spring-actuated belt-shipper, the rock-shaft and arms connected therewith forming a lever connection with said belt-shipper, one of said arms having a notch to engage a detent, the pivoted detent, and the tappet-chain, substantially as described.

37. In a circular-knitting machine organized for circular and reciprocating work, the combination with narrowing and widening devices, including pickers and moving cam-grades for actuating them and said cams being movable into and out of operative relation with said pickers, of a shifter-plate for moving said cam-grades into and out of operative position, substantially as described.

38. In a circular-knitting machine organized for circular and reciprocating work, the combination with narrowing and widening devices including pickers, and moving cam-grades for actuating them, said cam-grades being movable into and out of operative relation with said pickers, of a shifter-plate and a tappet-chain and provisions enabling the same to control the position of said shifter-plate, substantially as described.

39. In a circular-knitting machine organized for circular and reciprocating work the combination with narrowing and widening devices, including pickers, of two picker-operating cams for narrowing, a single picker-operating cam for widening, and a shifter-plate coöperative with said cams, and adapted when in one position to throw the narrowing-cams into and the widening-cam out of operation, and when in another position to throw the narrowing-cams out of and the widening-cam into operation, and means for changing the position of the shifter-plate, substantially as described.

40. In a circular-knitting machine organized for circular and reciprocating work, the combination with the pickers, of devices for moving them from needle to needle including two separate trains of gears, two segments for actuating said trains of gears, and a reversing-lever for bringing different members of said trains into engagement with said segments, substantially as described.

41. In a circular-knitting machine organized for circular and reciprocating work, the combination with the pickers, of two worms or screws for moving the same, two trains of gears, one for each worm or screw, two segments for actuating said trains of gears, and a reversing-lever for bringing different members of said trains into engagement with said segments, substantially as described.

42. In a circular-knitting machine organized for circular and reciprocating work, the combination with the pickers, of a pivoted lever, and means for moving the pickers from needle to needle including two separate trains of gears parts of which are mounted on said lever, two segments for operating said trains of gears and adapted to engage different members of said trains, and a pattern-disk for controlling said lever to bring different members into engagement with said segments, substantially as described.

43. In a circular-knitting machine organized for circular and reciprocating work, the combination with the needle-operating devices for reciprocating work, of the pickers, a pivoted lever, and means for moving the pickers from needle to needle including two trains of gears, having a part of each mounted on said lever, and two segments for operating said trains of gears, said segments being out of diametrical alinement with each other, substantially as described.

44. In a circular-knitting machine the combination with the needle-cylinder and a cam for circular work having the depressing portion of the same movable into and out of position, of shouldered needles and supporting-sectors adapted to be thrown into engagement with said shoulders, substantially as described.

45. In a circular-knitting machine the combination with a needle-cylinder, and a cam or cams for circular work having their depressing portions movable into and out of operative position, of shouldered needles, supporting-sectors and a cam-annulus to throw said sectors into and out of engagement with the shoulders of the needles, substantially as described.

46. In a circular-knitting machine organized for circular and reciprocating work, the combination with a cam rotating past the entire series of needles for circular work, a cam and means for operating it for reciprocating work, a thread-guide operatively connected with the reciprocating cam for movement in unison therewith past the needles in operation during reciprocating work, narrowing and widening devices operatively connected with said cam and thread-guide and automatic devices for changing from circular to reciprocating work and from reciprocating to circular work, substantially as described.

47. In a circular-knitting machine organized for circular and reciprocating work, the combination with a cam and thread-guide and means for rotating it past all the needles of the series in circular work, a cam and means for reciprocating it for reciprocating work, a thread-guide operatively connected with the said reciprocating cam for movement in unison therewith past the needles in operation during reciprocating work, and automatic mechanism for throwing the circular cam and its thread-guide out of operation and starting the requisite devices for reciprocating work and for stopping reciprocating work and throwing the circular cam and its thread-guide into operation for circular work, substantially as described.

48. A circular-knitting machine having a plurality of needle-operating cams and forming two or more rows of stitches during each revolution of the moving parts of the machine during circular work, one of its cams operating during reciprocating work, actuating means for circular and reciprocating work, a thread-guide coöperating with the cam operative during reciprocating work and automatic devices controlling said cam for reciprocating work and its coacting thread-guide, substantially as described.

49. In a circular-knitting machine the combination with the needle-cylinder and its needles, of a cam-cylinder having two or more cams for circular work, thread-guides for said cams, a bobbin-carrier moving with said cam-cylinder, a cam-cylinder having a cam for reciprocating work, an independent thread-guide moving with the reciprocating cam-cylinder past the needles in operation, and an automatic mechanism for throwing the bobbin-carrier and reciprocating thread-guide into and out of operation, substantially as described.

50. In a circular-knitting machine organized for circular and reciprocating work, the combination with one or more cams operative during circular work, of a thread-guide for each cam, and a bobbin-carrier moving in unison with said cam or cams operative during circular work and an automatic mechanism for throwing said bobbin-carrier into and out of operation, substantially as described.

51. A circular-knitting machine having two or more needle-cams operative at one time whereby two or more rows of stitches are formed during a single revolution of the moving parts of the machine, mechanism for bringing all of the needles at one time to a single level, and means for holding said needles in such position, substantially as described.

52. A circular-knitting machine having two or more needle-cams operative at one time whereby two or more rows of stitches are formed during a single revolution of the moving parts of the machine, means for bringing all of the needles at one time to a single level, and a needle-holder substantially as described.

53. In a circular-knitting machine the combination with the needle-cylinder, and its needles having holding-shoulders, of two or more needle-operating cams for forming two or more rows of stitches during a single revolution of the moving parts of the machine, means for bringing the needles to a level above the needle-cylinder and a needle-holder for engaging the holding-shoulders of the needles, substantially as described.

54. A circular-knitting machine having a single circular series of needles, two or more cams each engaging all the needles of the series during circular work, a needle-operating cam operative during reciprocating work, thread-supplying devices for the cams in operation during circular work, a single reciprocating thread-supplying device operatively combined with the reciprocating cam and narrowing and widening devices coacting with said thread guide and cam, substantially as described.

55. In a circular-knitting machine the combination with the knitting cylinder and needles, of two or more cams operative during circular work, a bobbin-carrier and a support therefor, a thread-guide for each of said cams moving in unison therewith, a cam operative during reciprocating work, and a thread-guide carried from the bobbin-carrier support, and operatively combined for movement in unison with the reciprocating cam past the needles in operation during reciprocating work, substantially as described.

56. In a circular-knitting machine the combination with the needle-cylinder and needles and means for operating them for circular and reciprocating work, of thread-supplying devices for circular and reciprocating work, including a thread-guide operative during reciprocating work and moving with the thread-supplying devices for circular work without supplying thread to the needles, substantially as described.

57. In a circular-knitting machine the combination with the needle-cylinder and needles, of two or more cams operative during circular work forming two or more rows of stitches at each revolution of the rotary parts of the machine, thread-supplying devices for each of said cams, a cam operative during reciprocating work and a thread-guide for said reciprocating cam, and provisions by virtue of which the said thread-guide is inoperative during circular work but moves with the rotary parts of the machine, substantially as described.

58. In a circular-knitting machine the combination with the needle-cylinder and needles, of cams for circular and reciprocating work, thread-supplying devices for circular and reciprocating work including a rotary bobbin-carrier and a thread-guide supported from said bobbin-carrier and moving in unison with the reciprocating cam past the needles in operation during reciprocating work, and moving with the bobbin-carrier during circular work, substantially as described.

59. In a circular-knitting machine the combination with two cam-cylinders, one for circular and one for reciprocating work, of a circular thread-guide, a reciprocating thread-guide, driving means for the circular cylinder and thread-guide, actuating means for the reciprocating cylinder and automatic devices for throwing the circular cylinder and thread-guide out of action and the reciprocating cylinder and thread-guide into action, and for throwing the reciprocating cylinder and thread-guide out of and the circular cylinder and thread-guide into action, substantially as described.

60. A knitting-machine containing the following instrumentalities, a needle-cylinder to contain a series of needles, a cam-cylinder having suitable cams to actuate said needles, a thread-carrier support, a thread-carrier to supply thread to said needles while reciprocating knitting is being done, an actuating means to reciprocate said thread-carrier on said support for reciprocating knitting and stop the operation of the said thread-guide during circular knitting, substantially as described.

61. A knitting-machine containing the following instrumentalities; a needle-cylinder to contain a series of needles, actuating means for said needles, a thread-carrier to supply thread to the needles during reciprocating knitting, said thread-carrier being detached from the needle-operating devices, means to reciprocate said thread-carrier for reciprocating knitting and means to throw said thread-carrier out of operation at the close of reciprocating knitting, substantially as described.

62. A knitting-machine containing the following instrumentalities; a needle-cylinder to contain a series of needles, actuating mechanism for said needles, a thread-carrier to supply thread to the needles during reciprocating knitting, said thread-carrier being detached from the needle-actuating devices, means to reciprocate said thread-carrier, and means for throwing said carrier into operation when reciprocating knitting is commenced, substantially as described.

63. A knitting-machine containing the following instrumentalities; a needle-cylinder to contain a series of needles, actuating mechanism for said needles, a thread-carrier for reciprocating knitting, a thread-carrier support, means to reciprocate said carrier on its support for reciprocating knitting, and means to throw said thread-guide out of operation at the close of reciprocating knitting and to hold the same out of operation during circular knitting, substantially as described.

64. The combination with a supporting sleeve or hub for the thread-guide, of the thread-guide pivoted thereto and the thread-guide spring, substantially as described.

In testimony whereof I affix my signature in presence of two witnesses.

GEORGE H. GILBERT.

Witnesses:
J. H. WHITAKER,
L. P. WHITAKER.